(12) United States Patent
Economy et al.

(10) Patent No.: US 7,211,642 B2
(45) Date of Patent: May 1, 2007

(54) THERMOSETTING AROMATIC DIELECTRIC MATERIAL

(75) Inventors: James Economy, Urbana, IL (US); Yongqing Huang, Wilmington, DE (US)

(73) Assignee: The Board of Trustees of the Univeristy of Illinois, Urbana, IL (US)

( * ) Notice: Subject to any disclaimer, the term of this patent is extended or adjusted under 35 U.S.C. 154(b) by 0 days.

(21) Appl. No.: 11/094,334

(22) Filed: Mar. 29, 2005

(65) Prior Publication Data

US 2006/0223898 A1 Oct. 5, 2006

(51) Int. Cl.
*C08G 63/00* (2006.01)
(52) U.S. Cl. .................... 528/272; 525/80; 525/181; 525/185; 526/72; 526/335; 526/336; 526/337; 526/340; 526/346
(58) Field of Classification Search .................. 526/72, 526/335, 336, 337, 340, 346; 525/80, 185, 525/181
See application file for complete search history.

(56) References Cited

U.S. PATENT DOCUMENTS

| | | | |
|---|---|---|---|
| 3,882,073 A * | 5/1975 | Cessna, Jr. .................. | 524/580 |
| 4,258,079 A | 3/1981 | Economy et al. | |
| 4,273,906 A | 6/1981 | Economy et al. | |
| 4,592,944 A | 6/1986 | Clark et al. | |
| 4,690,962 A | 9/1987 | Clark et al. | |
| 6,884,862 B2 * | 4/2005 | Okada et al. ............... | 526/285 |
| 2003/0099847 A1 | 5/2003 | Cunningham et al. | |

FOREIGN PATENT DOCUMENTS

| | | |
|---|---|---|
| EP | 095 048 | 11/1983 |
| JP | 2003261682 | 9/2003 |

OTHER PUBLICATIONS

Abstracts for Materials Research Society meeting, Spring 2005, published Feb. 28, 2005.
Business Wire, "Chipmakers break low k barrier, Take leap forward to drive next-generation electronics using applied black diamond"., http://www.businesswire.com/cgi-bin/mmg.cgi?eid=4565545, Feb. 4, 2004.
Callstrom, M. R., et al., "Poly[ethynylene(3-n-butyl-2,5-thiophenediyl)-ethynylene]: A soluble polymer containing diacetylene units and its conversion to a highly cross-linked organic solid"., Macromolecules, vol. 21, pp. 3528-3530, (1988).
Dawson, D.J., "Thermally stable polymers for electronic applications"., Reactive Oligomers, ACS Symposium 282, Harris, F.W.; Spinell, H.J. (Eds), Washington D.C., pp. 63-79, (1985).

Economy, J., "High temperature polymers for electronic devices"., Contemporary topics in polymer science., vol. 5, Hg. von E. J. Vandenberg., pp. 351-373, Plenum Press, (1984).
Grovu-Ivanoiu, M., et al., "Electroinitiated polymerization of p-diethynylbenzene"., Makromol. Chem., vol. 186, pp. 2247-2254, (1985).
Hay, A.S., "Oxidative coupling of acetylenes"., J. Org. Chem., vol. 25, pp. 1275-1276, (1960).
Hay, A.S., "Oxidative polymerization of diethynyl compounds"., Journal of Polymer Science, part A-1, vol. 7, pp. 1625-1634, (1969).
Kwock, E.W., et al., "Synthesis and characterization of soluble, high molecular weight poly(aromatic diacetylenes)"., Macromolecules, vol. 26, No. 11, pp. 2935-2940, (1993).
Lammers, D., "IBM may drop low-k materials for advanced ICs"., EE Times, http://www.eetimes.com/showArticle. jhtml?articleID=10801523, Apr. 17, 2003.
Lammers, D., "Worries dull SILK's sheen at IBM Micro"., EE Times, http://www.eetimes.com/showArticle. jhtml?articleID=18308274, Apr. 21, 2003.
Martin, S.J., et al., "Development of a low-dielectric-constant polymer for the fabrication of integrated circuit interconnect"., Advanced Materials, vol. 12, No. 23, pp. 1769-1778, (2000).
Miller, T.M., et al., "Properties and photodefinition of poly(aromatic diacetylenes)"., Chem. Mater., vol. 6, No. 9, pp. 1569-1574, (1994).
Morgen, M., et al., "Low dielectric constant materials for ULSI Interconnects"., Annu. Rev. Mater. Sci., vol. 30, pp. 645-680, (2000).
Oliver, W.C., et al., "An improved technique for determining hardness and elastic modulus using load and displacement sensing indentation experiments"., Journal of Materials Research, vol. 7, No. 6, pp. 1564, (1992).
Peercy, P.S., "The drive to miniaturization"., Nature, vol. 406, pp. 1023-1026, (2000).
Rutherford, D.R., et al., "Poly(2,5-ethynylenethiophenediylethynylenes), related heteroaromatic analogues, and poly(thieno[3,2-b]thiophenes). Synthesis and thermal and electrical properties"., Macromolecules, vol. 25, No. 9, pp. 2294-2306, (1992).
Rutherford, D.R., et al., "Poly(ethynylene-2,5-thiophenediylethynylenes). Processable, reactive polymers that thermally cross-link"., Macromolecules, vol. 21, No. 12, pp. 3530-3532, (1988).

(Continued)

Primary Examiner—Terressa Boykin
(74) Attorney, Agent, or Firm—Evan Law Group LLC

(57) ABSTRACT

A polymer comprises at least two types of monomer units selected from: (1) diethynyl benzene units, (2) triethynyl benzene units, and (3) ester units. After curing, the polymer may form a condensed polyaromatic dielectric having a dielectric constant of at most 2.0 at 1 MHz, an elastic modulus of at least 7.7 GPa, and a hardness of at least 2.0 GPa.

36 Claims, 11 Drawing Sheets

OTHER PUBLICATIONS

Sematech News, "International Sematech demonstrates ultra low-k material for dual damascene"., http://www.sematech.org/public/news/releases/20031119.htm., Sematech Inc., (2003).

Wegner, G., "I. Mitt.: Polymerisation von derivaten des 2.4-Hexadiin-1.6-diols im kristallinen zustand"., Z. Naturforschg., vol. 24 b, No. 7, pp. 824-832, (1969).

White, D.M., "Polyacetylenes by oxidative coupling: Synthesis and properties"., Am. Chem. Soc., Div. Polym. Chem., vol. 12, No. 1, pp. 155-161, (1971).

International Search Report dated Sep. 8, 2006 for PCT application No. PCT/US2006/011604.

* cited by examiner

THERMOSETTING AROMATIC DIELECTRIC MATERIAL

BACKGROUND

Minimization in integrated circuit (IC) dimension allows faster device speed, higher device packing density, and the integration of more functions on a single chip. However, the propagation delays increase with increasing numbers of interconnects, and limits the overall performance of the device. From a materials point of view, in order to lower the propagation delay, higher conductivity metallization and lower dielectric constant (k) materials are required to replace the Al and $SiO_2$/polyimide interconnect structure [1]. Although Cu has successfully replaced Al and become the current metallization material, designing low-k dielectrics remains one of the main challenges today.

Development of low-k materials has lagged behind other areas of semiconductor R&D [2]. As early as 1999, the Internal Technology Roadmap for Semiconductors (ITRS) called for materials having a dielectric constant of 2.2, a goal that was modified several times and ultimately pushed out to 2007 [3]. The reason for this lag is that interlayer dielectric (ILD) materials need to meet stringent material property requirements for successful integration into the structures. These include sufficient mechanical properties to survive chemical mechanical polishing (CMP) processing. Moreover, properties, such as Young's modulus, hardness, and thermal conductivity decrease with increasing porosity, which is used to achieve lower k values [4].

In April 2000, IBM announced its intent to use SiLK™ (Dow Chemical Co.) [5], a spin-on aromatic thermosetting polyphenylene. By 2003, IBM considered abandoning SiLK™, because of its low mechanical properties (Young's modulus of 2.45 GPa and hardness of less than 0.38 GPa [5]) and mismatch in coefficient of thermal expansion with both metal and ceramic substrates [6]. In February 2004, Applied Materials held a press conference to trumpet the use of its Black Diamond™ low-k CVD film by several firms in 90 and 130 nm critical dimension semiconductors [7]. Black Diamond™ is derived from plasma polymerization of siloxane and has a general composition of $SiO_xC_yH_z$. It has a dielectic constant lower than 2.7, an elastic modulus of 3.5 GPa and a hardness greater than 1.5 GPa. During the conference, Farhad Moghadam pointed out that a key property of the material is the hardness, which is greater than 1.5 GPa. However, the extendability of Black diamond™ to next generation materials (k<2.4) is questionable.

Aromatic polydiacetylenes appeared to be good low-k candidates because they are known to have a relatively low k value, low moisture uptake, excellent thermal stability, and a curing reaction which proceeds without evolving volatiles. Poly(m-diethynyl benzene) (polyDEB) was initially discovered in the early 1960s by Hay and co-workers [11]. The high molecular weight polymer was prepared by the oxidative coupling of m-diethynyl benzene. The polymer undergoes an apparent exothermic decomposition upon heating to 180° C. and showed a weight retention of over 90% after heating to 800° C. under inert conditions [12]. Alternatively, the decomposition observed at 180° C. could have been the result of an uncontrolled exothermic curing process. Poly-DEB is an aromatic polydiacetylene, having butadiynylene groups (—C≡C—C≡C—) along the polymer backbone. In 1969, Wegner [13] reported that monomeric diacetylenic single crystals could be polymerized by ultraviolet radiation. This finding suggested that polymers containing diacetylene units would have potential as photoresists.

Poly(p-diethynyl benzene) (polyPEB) typically has high crystallinity and is difficult to dissolve in common solvents. A cured thin film of polyPEB is very brittle [14]. Economy et al. [15–16] developed a highly soluble poly(triethynyl-benzene) (polyTEB) as a thermally stable insulating thin film for electronic applications. However, its poor adhesion, huge exotherm during curing, brittleness and high cost limited further applications. TEB oligomers synthesized and formed into films according to their methods broke into small pieces during thermal curing even though the film thickness was below 1 µm. A thinner film (less than 500 nm) could be formed by applying an adhesion promoter. UV pretreatment could be used to further reduce the exotherm during thermal curing. DEB has better solubility and less rigidity than PEB, as well as a lower exotherm and cost compared to TEB. However, its solubility in common organic solvents is still low for use in spin-on coating techniques and it has a tendency to crack prior to curing, resulting in poor film formability [17–18]. Several studies have been carried out to solve the low solubility problem of polyDEB. Stille and Whitesides [19–21] made soluble poly(diacetylene) by incorporating a solubilizing aliphatic side group. Miller et al. [22] synthesized several copolymers containing aromatic diacetylenes and showed the dielectric constants for these polymers were around 2.82 to 3.34 with low moisture uptakes, good film formability and photo definition.

SUMMARY

In a first aspect, the present invention is a polymer comprising at least two types of monomer units selected from the group consisting of: (1) diethynyl benzene units, (2) triethynyl benzene units, and (3) ester units.

In a second aspect, the present invention is a condensed polyaromatic dielectric, having a dielectric constant of at most 2.4 at 1 MHz, an elastic modulus of at least 6.0 GPa, and a hardness of at least 1.8 GPa.

In a third aspect, the present invention is a condensed polyaromatic dielectric, having a dielectric constant of at most 2.0 at 1 MHz, an elastic modulus of at least 7.7 GPa, and a hardness of at least 2.0 GPa.

DEFINITIONS

The term "polymer" as used herein includes both polymers and oligomers.

The symbol α, and the symbol ω, are used to indicate capping units of a polymer. A polymer may have more than two capping units, such as the polymer α,ω-ethynylbenzyl-poly(1,3,5-triethynyl benzene) of formula (I):

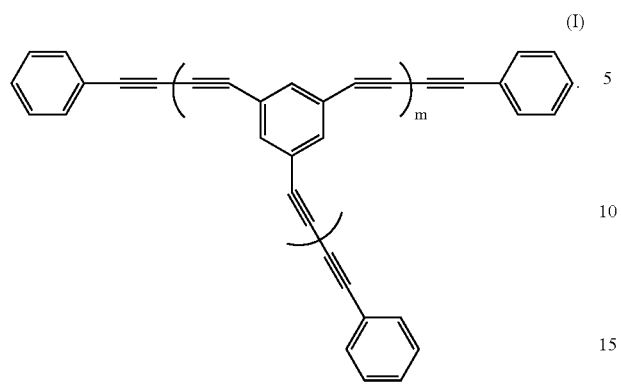

(I)

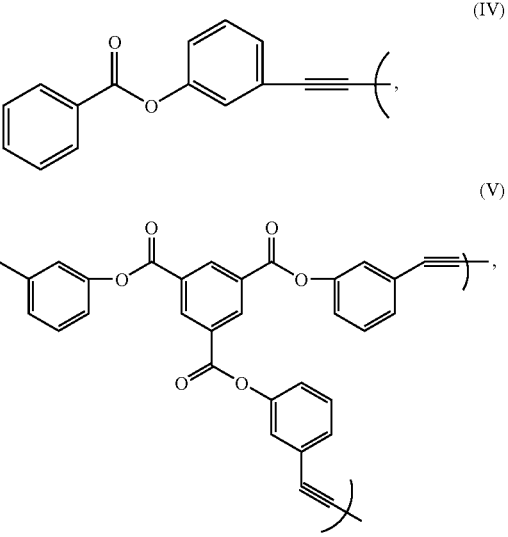

(IV)

(V)

The term "diethynyl benzene unit" means a monomer unit containing a phenyl group attached to two ethynyl groups, such as an m-diethynyl benzene unit of formula (II):

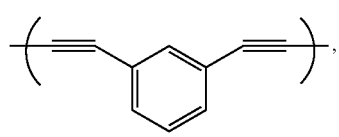

(II)

(VI)

where the bonds which pass through the parentheses are attached to other units of the polymer.

The term "triethynyl benzene unit" means a monomer unit containing a phenyl group attached to three ethynyl groups, such a 1,3,5-triethynyl benzene unit of formula (III):

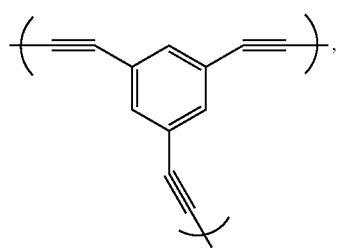

(III)

where the bonds which pass through the parentheses are attached to other units of the polymer.

The term "ester unit" means a monomer unit containing an ester linkage. The term "phenyl ester unit" means a monomer unit contain a phenyl group and an ester linkage, such as a benzoyl-oxy-1,3-phenyl-ethyn-2-yl unit of formula (IV), a tris-(ethyn-2-yl-1,3-phenyl)trimesate unit of formula (V), and a bis-(ethyn-2-yl-1,3-phenyl)isophthalate unit of formula (VI):

where the bonds which pass through the parentheses are attached to other units of the polymer.

DETAILED DESCRIPTION

Figure 1:
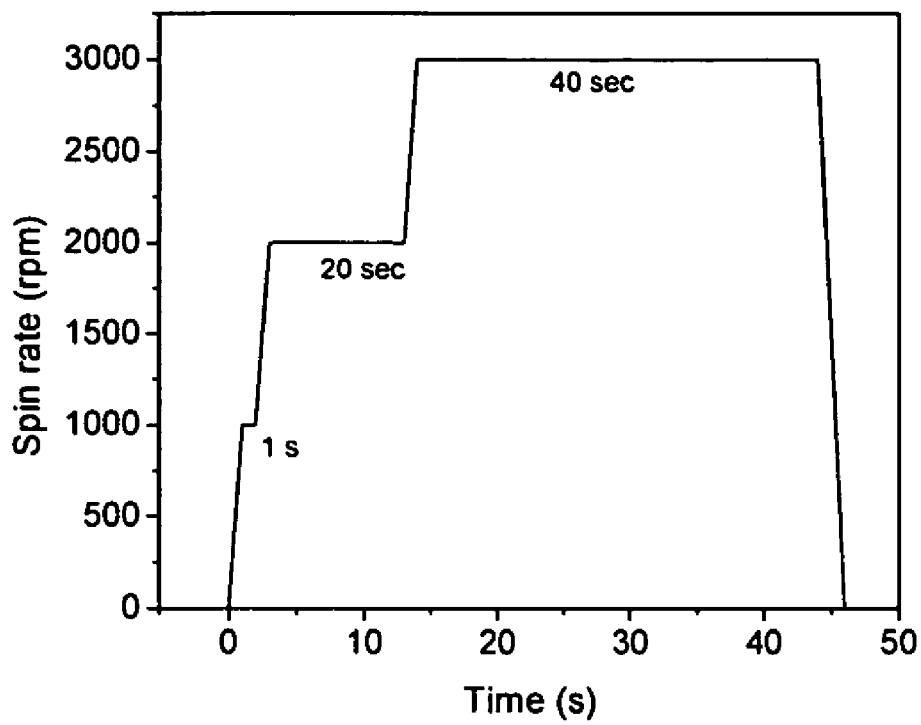
FIG. 1 is a graph of a spin coating cycle to achieve a 700 nm thick poly(DEB-co-TEB) film after curing.

The present invention makes use of the discovery that polymers of diethynyl benzene or triethynyl benzene, with each other or with esters, form compositions which may be cured to produce low dielectric constant materials. The materials are particularly suitable for used as interlayer dielectric materials in semiconductor structures and devices, as well as in electronic devices. The low dielectric constant of these materials may be reduced even further when they are formed as porous structures.

The polymers of the present invention contain diethynyl benzene units or triethynyl benzene units, together with ester units. Alternatively, the polymer may contain both diethynyl benzene units and triethynyl benzene units, and optionally ester units. Preferably the diethynyl benzene units are m-diethynyl benzene units. Preferably, the triethynyl benzene units are 1,3,5-triethynyl benzene units. When both diethynyl benzene units and triethynyl benzene units are present, the ratio of the two types of units is preferably 10:1 to 1:5, more preferably 4:1 to 1:2. Preferably the ester units are phenyl ester units, such as benzoyl-oxy-1,3-phenyl-ethyn-2-yl units, tris-(ethyn-2-yl-1,3-phenyl)trimesate units, or bis-(ethyn-2-yl-1,3-phenyl)isophthalate units. Preferably the ester units are capping units.

The polymers of the present invention are soluble in a variety of organic solvents, such as tetrahydrofuran (THF), cyclohexanone, 1-methyl pyrrolidinone (NMP), and phenylacetylene. Preferably, the polymer has a solubility at 20° C. of at least 1 wt %, more preferably at least 5 wt %, even more preferably at least 20 wt %, and most preferably at least 40 wt %, in at least one of the following solvents: THF, cyclohexanone, NMP, and phenylacetylene.

In order to form a porous material having a lower dielectric constant (i.e., a dielectric constant of at most 2.2), the polymer may be mixed with a porogen. A porogen is a material that will form pores in the material during or after curing (or cross-linking) of the polymer. Preferably, the porogen is a polymer or an organic material which is soluble in a solvent used to dissolve the polymer. Examples of porogens include polystyrene, copolymers of polystyrene, and organic acids such as abietic acid. Preferably, solutions of the polymer together with the porogen contain 30–40 wt % solids. Preferably, the pores formed in the material are not open to the outside of the material. Preferably the pores have an average diameter of 2–50 nm, more preferably 5–30 nm. Preferably, the size of the pores is $\frac{1}{5}$ to $\frac{1}{100}$ the thickness of the layer of cured material when used as an interlayer dielectric (typically, with a thickness of 1000–5000 angstroms). Preferably, the cured material has a porosity of 0–60%, such as 10%, 20%, 30%, 40%, and 50%.

Films or layers of the polymer, preferably dissolved in a solvent, and preferably with a porogen, may be formed by a variety of methods, including spray coating, casting, and spin coating. The solvent may be removed, and then the film may be cured or cross-linked using ultraviolet light, heating, or both. Furthermore, the films may be patterned using a mask together with ultraviolet light (or shorter wavelength radiation such as X-rays or an electron beam), since those portions not exposed may be dissolved away with the solvents noted above. Heat may be used to remove the porogen, in order to form a porous layer. The film may also be patterned using reactive ion etching. Patterning, with light or by etching, may also be used to form a porous layer, although this is less preferred.

The cured material preferably has a dielectric constant (as measured at 1 MHz) of at most 2.7, such as 2.7–1.5, more preferably the dielectric constant is at most 2.0, such as 2.0–1.6, such as 1.7, 1.8 and 1.9. The Young's modulus is preferably at least 6.0 GPa, more preferably at least 7.0 GPa, and most preferably at least 7.7 GPa. The hardness is preferably at least 1.8 GPa, more preferable at least 1.9 GPa, and most preferably at least 2.0 GPa.

The processing steps used to form parts of a semiconductor structure or a semiconductor device, including the etching of the layers and other steps such as polishing, cleaning, and depositing, are well known to those of ordinary skill in the art, and are also described in Encyclopedia of Chemical Technology, Kirk-Othmer, Volume 14, pp. 677–709 (1995); Semiconductor Device Fundamentals, Robert F. Pierret, Addison-Wesley, 1996; Wolf, Silicon Processing for the VLSI Era, Lattice Press, 1986, 1990, 1995 (vols 1–3, respectively), and Microchip Fabrication 4rd. edition, Peter Van Zant, McGraw-Hill, 2000.

The semiconductor structures of the present invention may be incorporated into a semiconductor device such as an integrated circuit, for example a memory cell such as an SRAM, a DRAM, an EPROM, and an EEPROM; a programmable logic device; a data communications device; a clock generation device; etc. Furthermore, any of these semiconductor devices may be incorporated in an electronic device, for example a computer, an airplane, a mobile phone or an automobile.

EXAMPLES

Materials

M-diethynyl benzene monomer was purchased from Lancaster Synthesis Inc. (Pelham, N.H.) and 1,3,5-triethynyl benzene was obtained from Alfa Aesar (Ward Hill, Mass.). Copper chloride (CuCl), phenylacetylene, hydrochloric acid, and all organic solvents, as well as all other chemicals, were purchased from Aldrich (Milwaukee, Wis.). All chemicals were used as received except for abietic acid which was purified by distillation at 260° C. under vacuum twice, and then collection of the fraction which distilled at 260° C.

Equipment $^1$H-NMR and $^{13}$C-NMR measurements were carried out using a VARIAN UNITY 400 NB NMR system. FT-IR spectra, 64 scans at 4 cm$^{-1}$ resolution, were obtained using a Nexus 670 FT-IR E. S. P. (Thermo Nicolet) and analyzed by Origin software. FT-IR samples were prepared by forming pellets with KBr powder. Molecular weights and distributions were measured using gel permeation chromatography (GPC) using a 3× Plgel 10 μm Mixed-B LS column at 25° C. THF was used as the solvent and polystyrene was used as a standard reference. Differential scanning calorimetry (DSC) measurements were obtained on a TA Instruments 2910 at a heating rate of 10° C./min in a nitrogen atmosphere from 30° C. to 400° C. Thermal stability was investigated by thermogravimetric analysis (TGA) using a TA Instruments, Hi-Res TGA 2950, and involved heating the samples from room temperature to 600° C. with a ramp rate of 10° C./min under nitrogen. Dielectric breakdown strength measurements were performed using a B&L probe station and a HP 4339B high resistance meter; DC voltages were applied to the sample stepwise from −100 V to 100 V. Dielectric constant and dielectric loss were measured using a probe station and a HP 4284A Precision LCR meter, at a frequency of 1 MHz for both capacitance and dielectric loss. The size of the electrode pad and the thickness of the thin film were measured using Tencor Alpha Step 200 profilometry. The dielectric constant was calculated from capacitance, film thickness and the area of the pad. Digital Instruments (DI) MultiMode AFM was used to measure the average surface roughness of a thin film on a Si wafer and to observe the surface topography of the thin film in tapping mode. A commercially available TriboScope 1-D transducer and Nanoscope IIIa controller from Hysitron Inc. (Minneapolis, Minn.) were attached to the DI MultiMode AFM to measure the Young's modulus and the hardness of polymer thin films. The shape of the diamond tip was a cube corner (three-sided pyramid). These measurements were quantified using published method [23], where the tip shape and system compliance are calibrated. The tests were conducted in the load range of 100 to 300 µN, which gave the maximum indentation depth in the range of about 30 to 100 nm. The load-vs-time profiles applied were trapezoidal, using the same loading and unloading rate of 10 µN/s. The indenter was held for several seconds once the maximum load was reached to reduce the creep effect during the unloading step. Experiments were carried out at room temperature under an air atmosphere. When the TriboScope 2-D transducer was used instead of the 1-D transducer, the instrument was also used to carry out a nanoscratch test. A 60° included angle conical diamond probe tip with a 1 µm spherical radius was used and the correct transducer constants were obtained by performing an air indent. A Hitachi S-4700 scanning electron microscope (SEM) was used to observe the pore structure of the thin film at an accelerating voltage of 10 kV. The sample was sputtered with a 10 Å thick platinum/gold coating before loading into the SEM chamber. Transmission electron microscopy (TEM) was carried out on a Philips CM-12 microscope operated at 120 kV.

Synthesis of Low Molecular Weight poly(m-diethynyl benzene) (DEB)

0.4966 g (0.005 mol) CuCl and 10 ml pyridine were charged into a 0.2 liter 3-neck round-bottom flask. Oxygen was purged more than 10 min and the light-green slurry in the flask turned dark-green. 1.2622 g (0.01 mol) m-diethynyl benzene and 3.29 ml (0.03 mol) phenylacetylene in 40 ml pyridine solution were charged into an addition funnel. The solution was added dropwise into the flask. The reaction was continued over 12 hours under an oxygen atmosphere. The reaction mixture was then added to a vigorously stirred beaker containing 300 ml methanol. The precipitant was washed with water, methanol and 2 N HCl, and then extracted by MeOH/2 N HCl (80:20) for 48 hours, and dried in a vacuum oven at around 60° C. overnight. A fine, light yellow powder was obtained in 75% yield. An FT-IR spectrum of DEB (see FIG. 4) showed acetylene $v(C{\equiv}C)$ stretch at 2220 cm$^{-1}$ and no ethynyl C—H stretch at 3300 cm$^{-1}$, indicating all ethynyl groups reacted to form diacetylene groups. $^1$H-NMR of DEB (CDCl$_3$, 400 MHz Brucker) displayed values of δ 7.35 (m, 9H, Ar—H), 7.49–7.52 (m, 10H, Ar—H) and 7.66 (s, 3H, Ar—H).

Synthesis of oligomer (m-diethynyl benzene)-co-(1,3,5-triethynyl benzene) (DEB-co-TEB)

A 2.0 liter, three-neck round-bottom flask equipped with an overhead stirrer, internal thermocouple, addition funnel, O$_2$ inlet, and heating mantle was charged with 13.3 g (0.13 mol) of CuCl and 700 ml of acetone. The agitated suspension was slowly heated to an internal temperature of 30° C. while the addition funnel was charged with a solution of 33 ml acetone and 33 ml pyridine; 8.3 ml of this solution was added to the flask. The light-green catalyst solution was pre-oxidized by bubbling O$_2$ through for about 10 min and the solution turned dark-green. The O$_2$ flow was continued throughout the rest of the reaction. The orange solution of 14.0 g (0.11 mol) DEB, 5.56 g (0.037 mol) 1,3,5-triethynyl benzene (TEB), 113.3 g (1.11 mol) phenylacetylene, and 8.3 ml of the acetone/pyridine mixture in 200 ml acetone was added in one portion. The temperature was raised to about 35° C. and the heating mantle was then removed. The remainder of the acetone/pyridine mixture was added over a period of 10 min. The addition funnel was replaced with a condenser. A heating mantle was then used to maintain the temperature around 40° C. for 12 hours. The reaction was conducted in the dark, covering with aluminum foil to prevent light-induced cross-linking.

Figure 5:
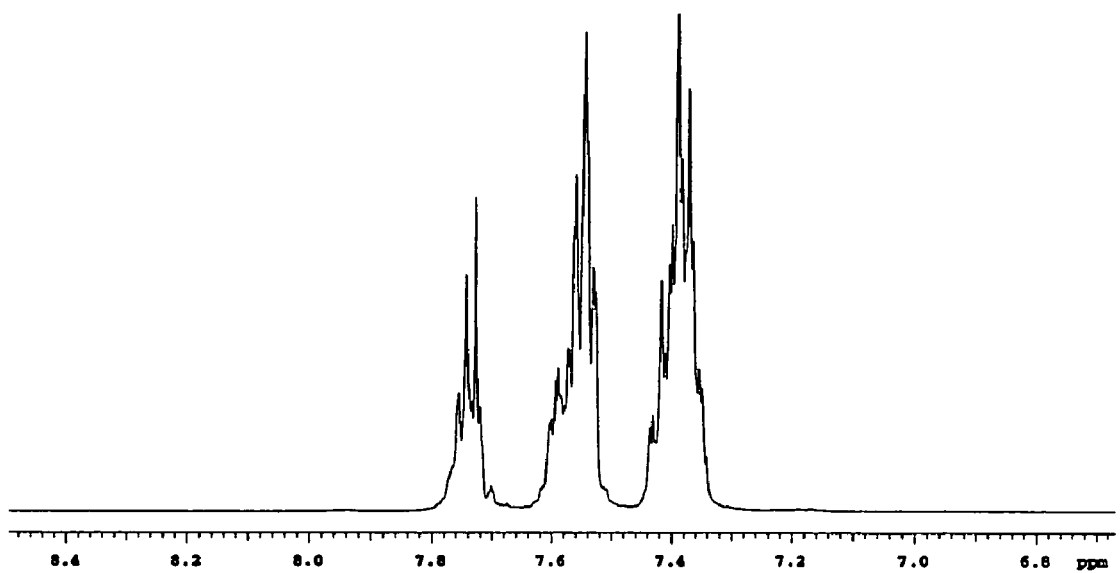
FIG. 5 is an $^1$H-NMR spectrum of poly(DEB-co-TEB), in which deuterated THF was used as a solvent.
Figure 6:
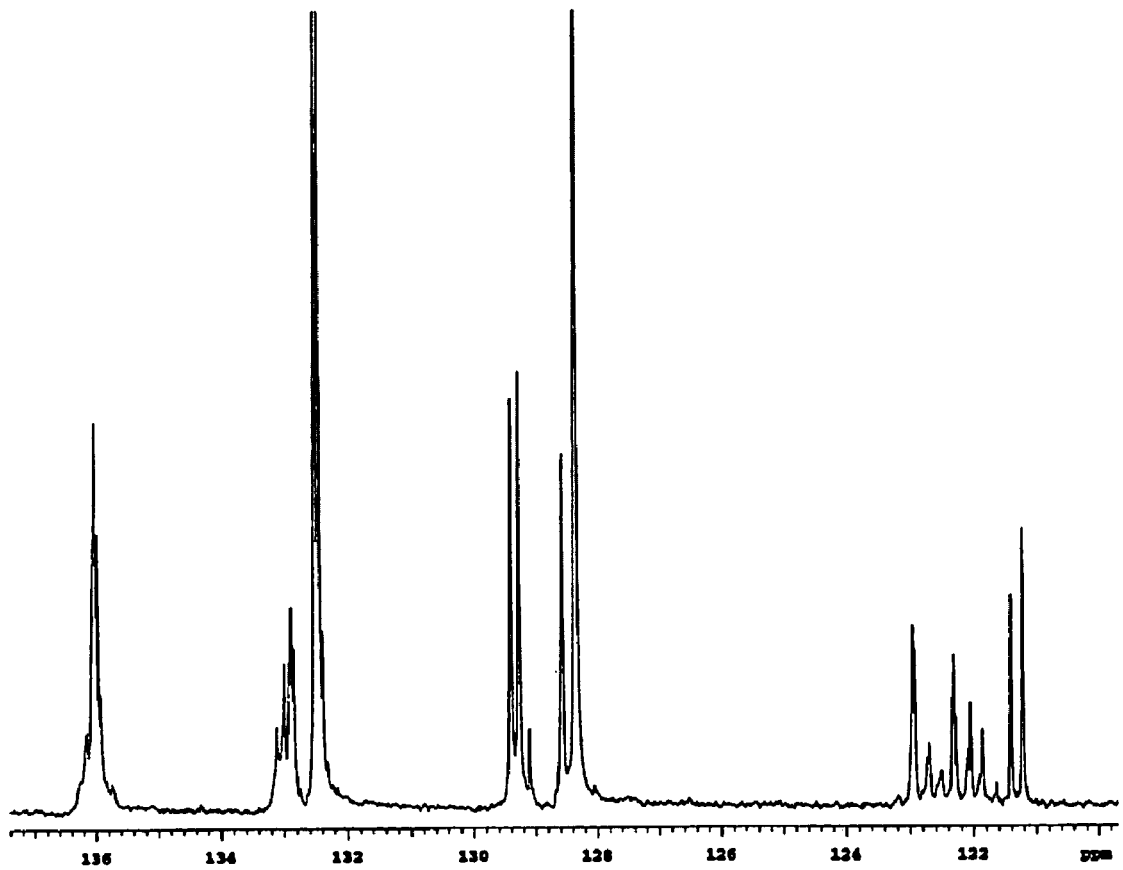
FIG. 6 is a $^{13}$C-NMR spectrum of poly(DEB-co-TEB), in which deuterated CDCl$_3$ was used as a solvent.
Figure 7:
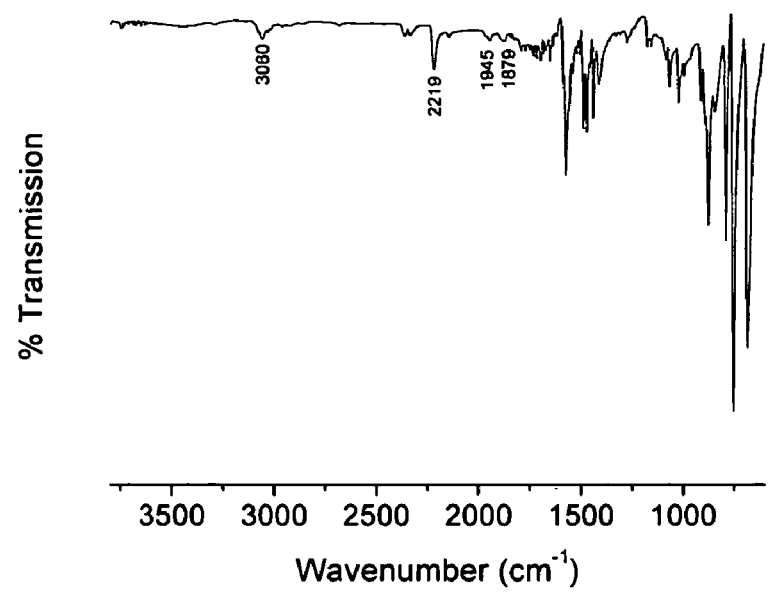
FIG. 7 is an FT-IR spectrum of DEB-co-TEB.

The reaction mixture was then added to a vigorously stirred solution of 55 ml HCl in 2000 ml methanol and the green yellow paste was collected by decanting and washing with methanol (2×50 ml). The crude polymer was redissolved in 500 ml chloroform. The solution was washed with 10% HCl (3×30 ml) or until the upper aqueous phase became colorless, then washed with DI water until the pH of the water phase was around 7. The reddish-orange organic phase was dried with 9 g MgSO$_4$ and filtered. The chloroform solution was slurried with 2 g 70–230 mesh silica gel and filtered. Then it was vacuum stripped and the residue was taken up in 40 ml of chloroform. The solution was precipitated from 800 ml methanol. Filtration of the solids, followed by washing with two 20 ml portions of methanol, and vacuum drying (50–55° C.) afforded 10.2 g of a light-orange powder (yield is 51.9%). An FT-IR spectrum of DEB-co-TEB also showed acetylene $v(C{\equiv}C)$ stretch at 2220 cm$^{-1}$ and no ethynyl C—H stretch at 3300 cm$^{-1}$, indicating all ethynyl groups reacted to form acetylene groups. $^1$H-NMR of DEB-co-TEB (THF-d8, 400 MHz Brucker) displayed values of δ 7.34–7.7.45 (m, 46H, Ar—H), 7.49–7.62 (m, 40H, Ar—H) and 7.7–7.8 (m, 15H, Ar—H). The structure of the purified copolymer was confirmed by $^1$H-NMR and $^{13}$C-NMR, shown in FIG. 5 and FIG. 6. FT-IR spectrum of DEB-co-TEB is shown in FIG. 7.

A 25~35 wt % DEB-co-TEB oligomer in 1-methyl-2-pyrrolidinone (NMP) solution was filtered through a 1 µm pore-size tetrafluoroethylene filter (Whatman Inc., Clifton, N.J.) and then spin coated onto a 2.47 cm×2.47 cm silicon dice to form a thin film with a thickness of 600 nm or 1000 nm depending on the concentration of the solution. All samples were spin coated following a cycle as illustrated in FIG. 1. The thin film was soft backed at 110° C. for 1 minute, cured at 200° C. for an hour and heated at 450° C. for half an hour.

Synthesis of benzoic acid 3-ethynyl phenyl ester (BAEPE)

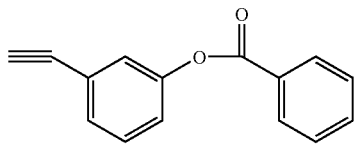

BAEPE

A solution of benzoyl chloride in 20 ml of $CH_2Cl_2$ was added using a syringe to a stirred mixture of m-ethynyl phenol (4.0 g), pyridine (10 ml), $CH_2Cl_2$ (40 ml) under $N_2$ at room temperature. After half of the solution was added, the mixture became cloudy and the color changed from light orange to yellow. The mixture was then refluxed at ~45° C. for 6 hours under $N_2$. More $CH_2Cl_2$ was added until a clear solution was obtained. The resulting solution was washed with 1 N HCl, 1 N NaOH and DI water 3 times, respectively, dried with anhydrous sodium sulfate, and filtered. The light yellow solution was evaporated under vacuum and then dried at ~40° C. in a vacuum oven overnight to obtain light yellow powder (7.52 g, 93% yield).

Synthesis of polyDEB with aromatic ester end group (polyEDEB)

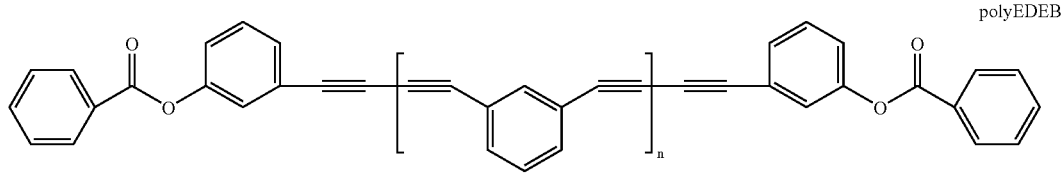

polyEDEB

CuCl (0.4953 g, 0.005 mol) and acetone (20 ml) were charged into a 3-necked round bottom flask equipped with a magnetic stirring bar. The agitated suspension was slowly heated to an internal temperature of 30° C., while the addition funnel was charged with a solution of acetone (0.809 ml) and pyridine (0.809 ml); 0.4 ml of this solution was added to the flask. The light-green catalyst solution was pre-oxidized by bubbling $O_2$ through it for about 10 min and the solution turned dark-green. The $O_2$ flow was continued throughout the rest of the reaction. The orange solution of 1.2616 g (0.01 mol) of DEB, 6.66 g (0.03 mol) of BAEPE and 0.4 ml of the acetone/pyridine mixture in 10 ml of acetone was added in one portion. The temperature was raised to about 35° C. and the heating mantle was then removed. The remainder of the acetone/pyridine mixture was added over a period of 10 min. After the acetone/pyridine addition was complete, a heating mantle was used to maintain the temperature around 40° C. for 12 hours. The reaction was conducted in dark (covering with aluminum foil) to prevent light-induced cross-linking reaction.

The reaction mixture was dropped into a vigorously stirred acidified methanol solution (13 ml 12 N HCl and 2000 ml methanol), filtered and washed with methanol until there was no detectable acid by pH paper. The light yellow creamy paste was then dissolved in $CHCl_3$ and purified on a silica gel column using $CHCl_3$/heptane with a 3:1 molar ratio as an eluent. The resulting solution was evaporated under vacuum, then dried at 55° C. in a vacuum oven overnight to obtain 1.9 g white powder.

Synthesis of (Tris-(3-ethynyl-phenyl) trimesate (TEPT)

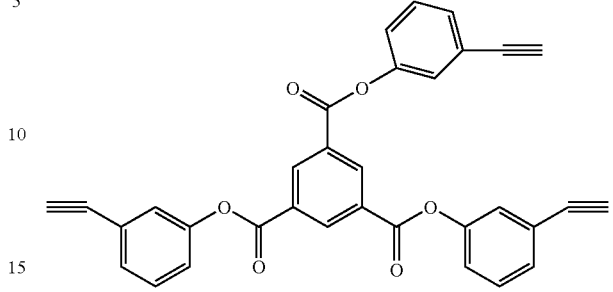

(TEPT)

Figure 16:
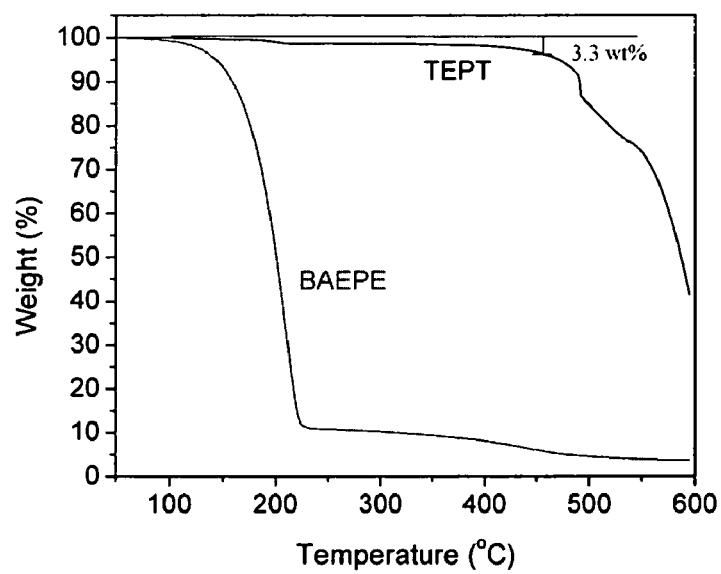
FIG. 16 shows TGA curves of TEPT and BAEPE under nitrogen.
Figure 17:
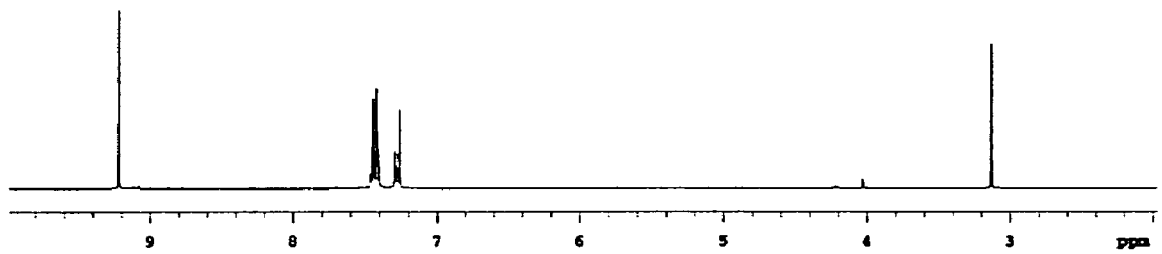
FIG. 17 is an $^1$H-NMR spectrum of TEPT.
Figure 18:
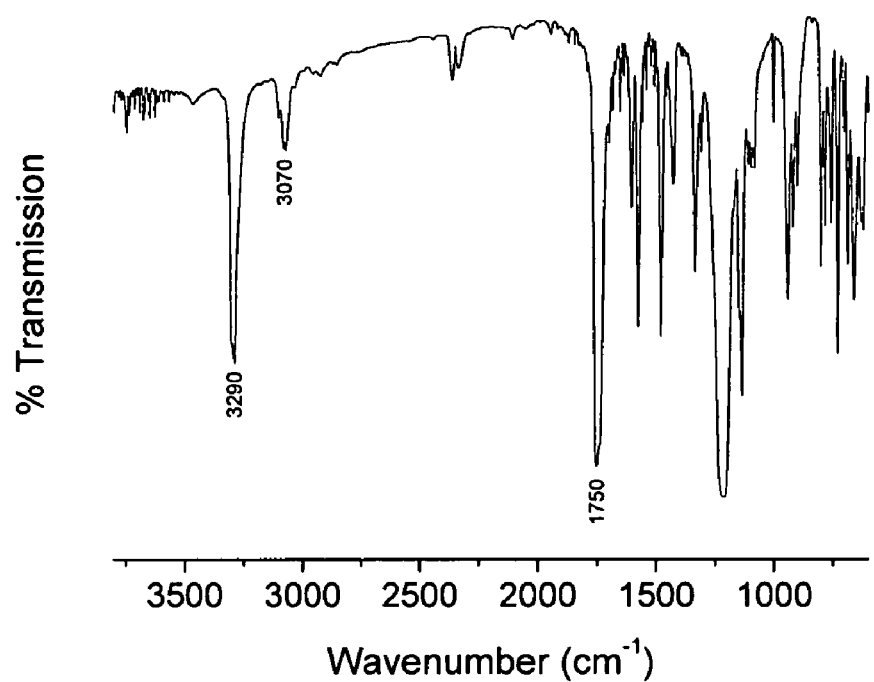
FIG. 18 is an FT-IR spectrum of TEPT.

To a 3-necked round bottom flask equipped with a magnetic stirring bar, 2 g (0.017 mol) of m-ethynyl phenol, 5 ml of pyridine, 20 ml of $CH_2Cl_2$ were charged under nitrogen at room temperature. A solution of 1.498 g (0.0055 mol) of 1,3,5-benzenetricarboxylic acid chloride in 10 ml of $CH_2Cl_2$ was added dropwise through a syringe. The orange solution gradually became cloudy and white precipitate was observed on the wall of the flask. The mixture was then refluxed at ~45° C. for 6 hours under $N_2$. The resulting light yellow solution was washed with 1 N HCl (3×20 ml), 1 N NaOH (3×20 ml) and water (3×20 ml), dried with anhydrous sodium sulfate, and filtered. The light yellow solution was evaporated under vacuum and then dried at ~50° C. in a vacuum oven overnight to obtain light yellow powder (1.66 g, 58% yield). The structure of TEPT was confirmed by $^1$H-NMR (δ 9.2 (m, 3H); 7.2–7.5 (m, 12H), see FIG. 17) and FT-IR (see FIG. 18, strong signal of the ethynyl C—H stretch at 3300 $cm^{-1}$ and ester group C=O stretch at 1750 $cm^{-1}$). TGA analysis illustrated that TEPT was significantly more thermally stable than that of the monomer, benzoic acid 3-ethynyl phenyl ester (BAEPE), for preparing polyEDEB (see FIG. 16).

Synthesis of DEB-co-TEPT

CuCl (1.3331 g, 0.0135 mol) and acetone (67 ml) were charged into a three-necked round bottom flask equipped with a magnetic stirring bar. The agitated suspension was slowly heated by a oil bath to an internal temperature of 30° C. while the addition funnel was charged with a solution of 3.33 ml acetone and 3.33 ml pyridine; 0.83 ml of this solution was added to the flask. The slurry was stirred for 10 min, and then oxygen was bubbled through the mixture. The light green slurry turned dark green. The $O_2$ flow was continued throughout the rest of the reaction. The orange solution of 1.8005 g (14.27 mmol) of DEB, 0.8095 g (1.59 mmol) of TEPT, 11.3375 g (0.111 mol) of phenylacetylene, and 0.83 ml of the acetone/pyridine mixture in 40 ml of acetone was added in one portion. The oil bath was removed. The rest of the acetone/pyridine mixture was added over a period of 30 minutes. The temperature was kept below 45° C. by an ice bath as needed. After the acetone/pyridine addition was complete, an oil bath was used to maintain the temperature 30–40° C. for 12 hours. The reaction was conducted in dark (covering with aluminum foil) to prevent light-induced cross-linking reaction.

The reaction mixture was dropped into a beaker containing vigorously stirred acidified methanol solution (11 ml of 12 N HCl and 400 ml of methanol), filtered and washed with methanol. The light yellow paste was then dissolved in about 50 ml of $CHCl_3$, washed with 10% by weight HCl (3×10 ml) and water (3×10 ml), dried (0.25 g magnesium sulfate), and filtered. The chloroform solution was vacuum stripped and the residue taken up in 20 ml of chloroform. This solution was precipitated from 600 ml of methanol. Filtration of the solids, washing with methanol, and vacuum drying at about 50° C. afforded 1.19 g white powder.

Sample Preparation for Electrical Testing

A 15 wt % DEB-co-TEPT oligomer in NMP solution was filtered through 1 μm pore-size polytetrafluoroethylene filter (Whatman Inc., Clifton, N.J.) and spin coated onto a 2.47 cm×2.47 cm silicon dice to form a thin film with the thickness of about 700 nm. The spin-coating recipe was to ramp at 250 rpm/s to 500 rpm for 2 seconds, ramp at 750 rpm/s to 1500 rpm for 2 seconds, ramp at 1500 rpm/s to 3000 for 2 seconds, and drop to 0 rpm at 200 rpm/s. The sample was soft baked at 110° C. for 1 min to remove most of the solvent and then cured in a vacuum annealer. The curing procedure was to ramp from 60 to 110° C. in 20 min, isotherm for 60 min; ramp to 200° C. in 30 min and isotherm for 60 min; ramp to 250° C. in 10 min and isotherm for 30 min; ramp to 350° C. in 30 min and isotherm for 30 min; and then cool down to 60° C.

Fabrication of Porous Dielectric Thin Film

Figure 2:
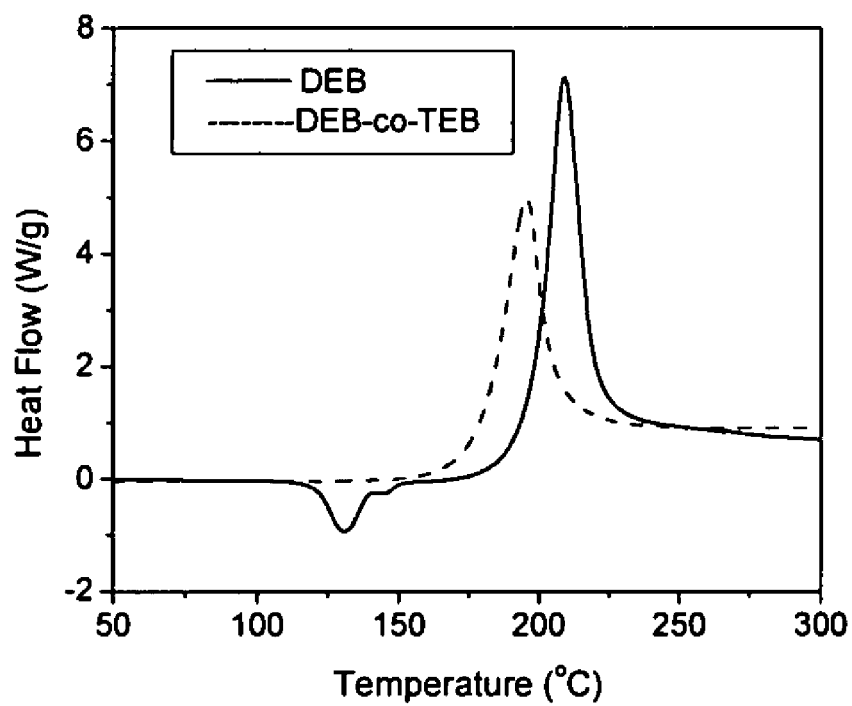
FIG. 2 shows DSC curves of DEB and DEB-co-TEB oligomers.

Low molecular weight polystyrene ($M_w$=780) was used as a porogen and dissolved in THF to provide a 25 wt % solution A. Another type of solution A was prepared by replacing polystyrene with abietic acid and selecting acetone as solvent. Solution B was prepared by dissolving DEB-co-TEB into cyclohexanone with 25 wt % concentration. Solution A and B was mixed (with various weight ratio) to form a new solution by stirring at room temperature for 2 hours and then allowed to sit for 12 hours. The resulting solutions were spin coated onto Si wafer dices or metal(gold)-deposited Si wafer dices (following a similar recipe shown in FIG. 2) and soft-baked on a hot plate at 110° C. for 1 minute to remove most of the solvent. The wafer was then cured in a vacuum annealer under a controlled heating. A typical curing recipe for forming a porous film was as following: ramp at 5° C./min to 200° C., hold at 200° C. for 30 min, ramp at 5° C./min to 250° C. and hold for 30 min, ramp at 3–5° C./min to 350° C. and hold for 30 min, and then ramp at 3–5° C./min to 450° C. and hold for 30 min to burn out the porogen. The film was then cooled to room temperature at 5° C./min.

Fabricate Samples for Electrcal Testing

For dielectric constant and breakdown strength measurements, upper Au electrodes (2000 Å thick) with area of 800×800 μm² were deposited on the polymer film surface by the mask-sputtering method (nickel TEM grids with area of 780×780 μm² used as the shadow masks) for forming a Au/dielectric film/Au sandwich structure metal-insulator-metal (MIM) or Au/dielectric film/Si metal-insulator-semiconductor (MIS).

Results and Discussion

Based on gel permission chromatography (GPC), the DEB oligomer was mainly comprised of trimer, tetramer and heptamer and so on. The number average molecular weight (Mn) was 710 and the average degree of polymerization was 4. The polymerization dispersity was 1.2. Although the molecular weight of DEB was relatively low, its solubility in common spin coating solvents was still low (see Table 1), which made it difficult to form a thin film by spin coating. Forming DEB-co-TEB oligomer greatly improved the solubility, from less than 5~10 wt % to about 20~40 wt %. This provided a wide processing window to form a uniform thin film by spin coating.

TABLE 1

The solubility of DEB-co-TEB and DEB in some common spin-coating solvents

| Solvent | DEB | DEB-co-TEB |
| --- | --- | --- |
| THF | ~10 wt % | >20 wt % |
| Cyclohexanone | ~5 wt % | ~40 wt % |
| NMP | <5 wt % | >30 wt % |
| Phenylacetylene | <5 wt % | >30 wt % |

Figure 3:
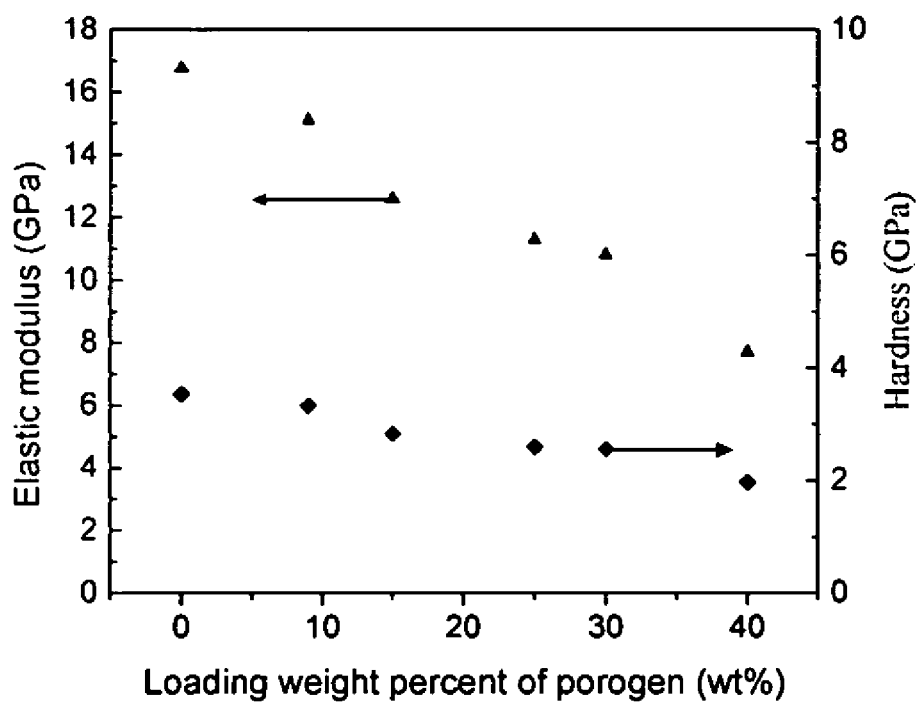
FIG. 3 shows the effects of porogen loading on the elastic modulus and hardness of 700 nm thick cured poly(DEB-co-TEB) thin film.
Figure 8:
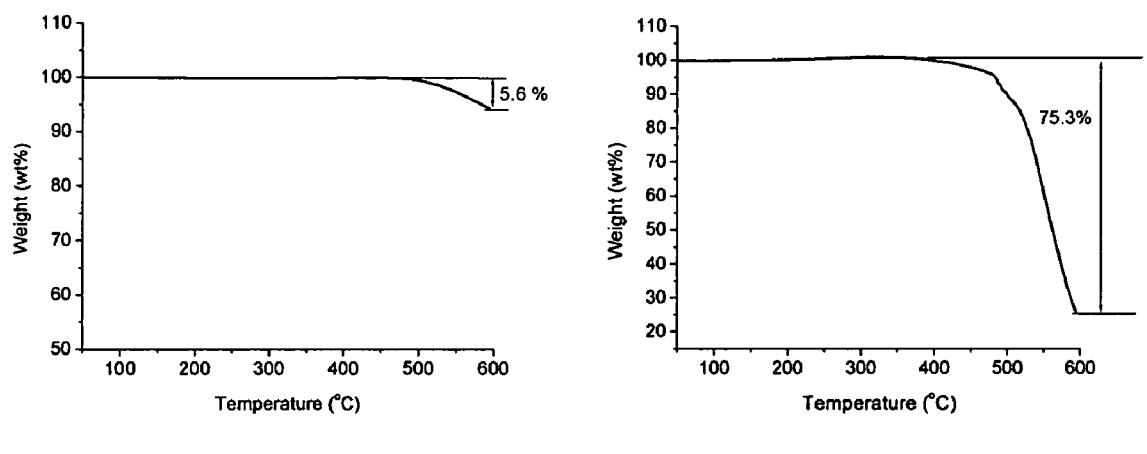
FIG. 8 shows TGA curves of cured poly(DEB-co-TEB) in N$_2$ (A) and air (B).

The DSC curves of DEB and DEB-co-TEB were compared in FIG. 3. DEB displayed a melting peak at around 130° C. and no melting peak was observed for DEB-co-TEB sample, consistent with an amorphous structure (further confirmed by X-ray diffraction). The curing reaction of DEB-co-TEB occured at around 195° C., and displayed a smaller exotherm compared to DEB. TGA showed that the cured DEB-co-TEB is stable up to 480° C. in $N_2$ with 5.6% weight loss at 600° C., and up to 400° C. in air (see FIG. 8). The cured thin film only had a 1.5 wt % weight loss when isothermally holding at 425° C. for 8 hrs. UV testing suggested that the DEB-co-TEB oligomer has a patterning potential due to the strong UV absorption at 226 and 342 nm.

The dielectric constant and the dissipation factor of cured poly(DEB-co-TEB) is 2.7 and 0.03 (both at 1 MHz), respectively. The breakdown strength is larger than 230 V/μm. The nanoindentation test was performed on the cured thin film with a thickness of around 700 nm and average roughness of 0.5 nm. The Young's modulus and hardness of the cured polymer thin film is around 16.8 GPa and 3.54 GPa, respectively. Polyimide (PI) thin film on Si wafer was also measured using the same instrument and displayed Young's modulus and hardness value of 3.8 GPa and 0.4 GPa, respectively. The dielectric constant showed little or no change when exposed to an ambient environment for several weeks, indicating low moisture pick-up by the cured thin film. The effects of porogen (polystyrene) loading on the dielectric constant, dissipation factor and breakdown strength are shown in Table 2. The dielectric constant of the poly(DEB-co-TEB) can be reduced to 1.85 by adding 40 wt % polystyrene. The breakdown strength and dissipation factor remains the same.

TABLE 2

The effect of the amount of porogen on electrical properties of cured DEB-co-TEB film

| Porogen (wt %) | Capacitance (pF) | Thickness (μm) | Dielectric constant | Dielectric loss | Breakdown strength (V/μm) |
| --- | --- | --- | --- | --- | --- |
| 0 | 6.20 | 0.85 | 2.70 | 0.01 | >235 |
| 9% | 5.89 | 0.86 | 2.59 | 0.02 | >232 |
| 15% | 5.28 | 0.90 | 2.43 | 0.04 | >222 |
| 20% | 4.92 | 0.95 | 2.39 | 0.03 | >211 |
| 25% | 4.47 | 1.02 | 2.26 | 0.02 | >196 |

TABLE 2-continued

The effect of the amount of porogen on electrical properties of cured DEB-co-TEB film

| Porogen (wt %) | Capacitance (pF) | Thickness (μm) | Dielectric constant | Dielectric loss | Breakdown strength (V/μm) |
|---|---|---|---|---|---|
| 30% | 4.17 | 1.00 | 2.13 | 0.02 | >192 |
| 35% | 12.51 | 0.92 | 2.03 | 0.03 | >217 |
| 40% | 11.53 | 0.91 | 1.85 | 0.02 | >220 |

Porous Structure

Figure 9:
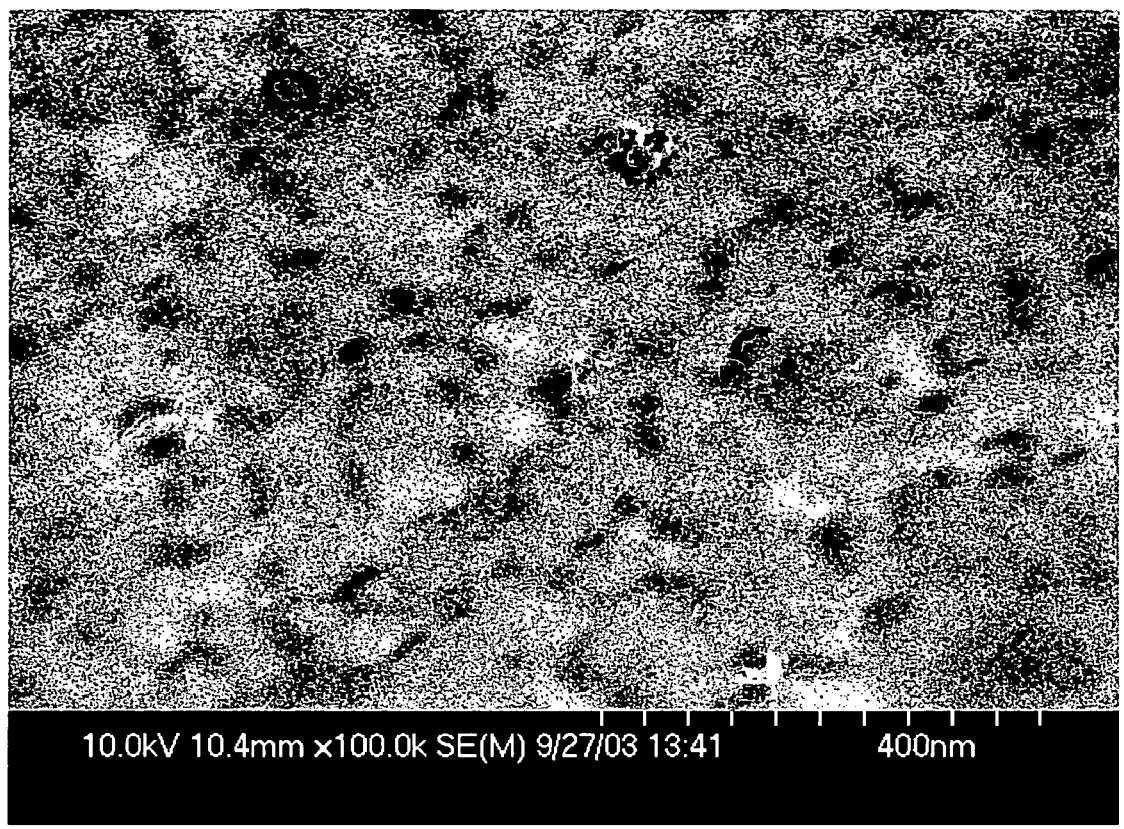
FIG. 9 is an SEM image of a cross section of the porous thin poly(DEB-co-TEB) film, using polystyrene as a porogen (loading content is 35 wt %).
Figure 10:
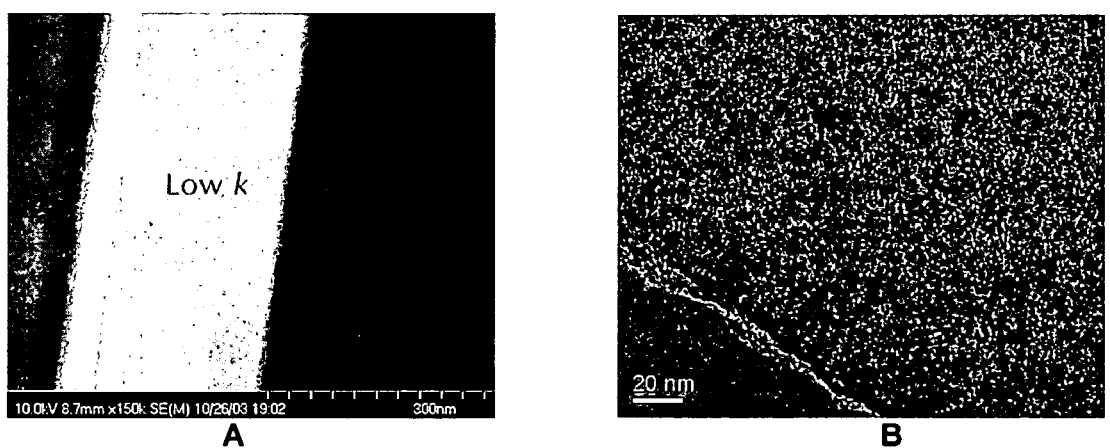
FIG. 10 shows an SEM image (A) and TEM image (B) of the cross section of the porous thin poly(DEB-co-TEB) film, using 35 wt % abietic acid as a porogen.

FIG. 9 shows the pore structure of the thin film prepared by directly mixing PS with DEB-co-TEB oligomer in cyclohexanone solution. The pores were closed and most had a sphere shape. However, the pore size was relatively large (around 20–40 nm). It is known that the matrix with smaller pores has better mechanical properties than that with larger pores when porosity and pore distribution are the same. Adding surfactant, poly(dimethylsiloxane) with mono-hydroxy termination, into the mixture can help to control the distribution of the pore but the size of the pore was still around 10–20 nm. To achieve smaller pore, abietic acid was chosen to replace PS. TEM image shows that the pore size was decreased to less than 5 nm (see FIG. 10).

Figure 4:
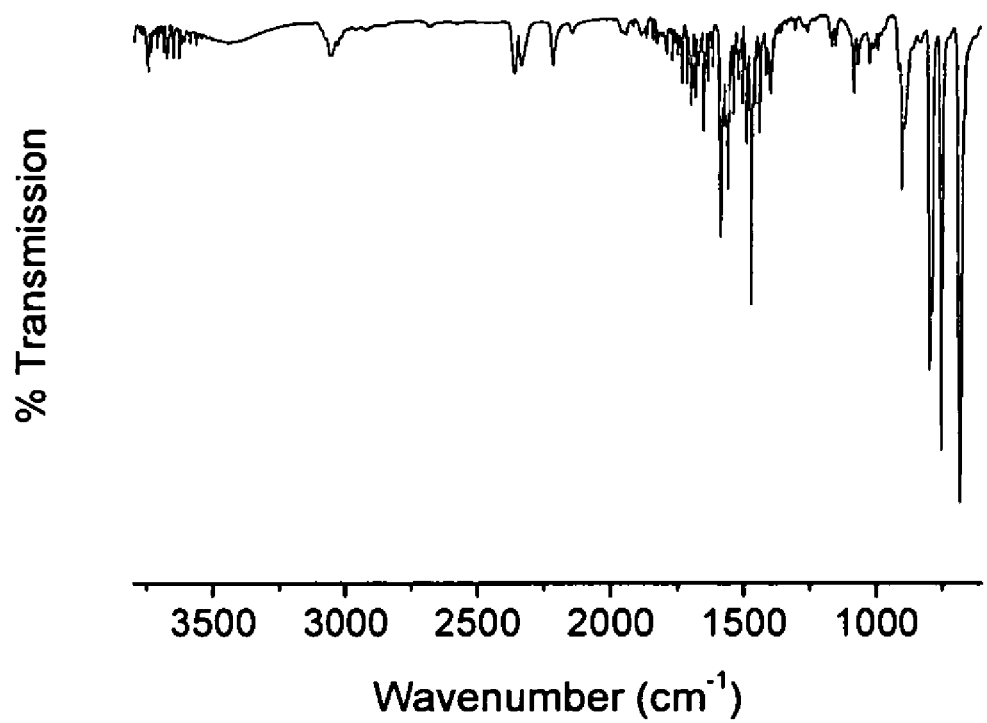
FIG. 4 is an FT-IR spectrum of m-diethynyl benzene oligomer.

The dependence of the elastic modulus and hardness on the loading amount of porogen is shown in FIG. 4. Both the elastic modulus and hardness of the polymer thin film gradually decreased with increased pore content. By adding 40 wt % polystyrene, the porous polymer film displayed an average elastic modulus of 7.71 GPa and hardness of 1.97 GPa, which is about 46% and 56% of that of the dense polymer film, respectively.

Characterization and Properties of EDEB

The structure of EDEB was confirmed by $^1$H-NMR ($\delta$ 8.14 (m, 4H); 7.5–7.6 (m, 2H); 7.40–7.45 (m, 4H); 7.10–7.33 (m, 6H), 7.20 (m, 2H). FT-IR spectrum showed diacetylene C≡C stretch at 2220 cm$^{-1}$, ester group C=O stretch at 1750 cm$^{-1}$, and no ethynyl C—H stretch at 3300 cm$^{-1}$, which further confirmed the structure. According to $^1$H-NMR and elemental analysis calculation, the degree of polymerization was about two.

TABLE 3

Comparison of the solubility of EDEB and DEB in some common spin-coating solvents

| Solvent | EDEB | DEB |
|---|---|---|
| Cyclohexanone | ~10 wt % | ~5 wt % |
| NMP | ~20 wt % | <5 wt % |
| Phenylacetylene | ~8 wt % | <5 wt % |

Figure 11:
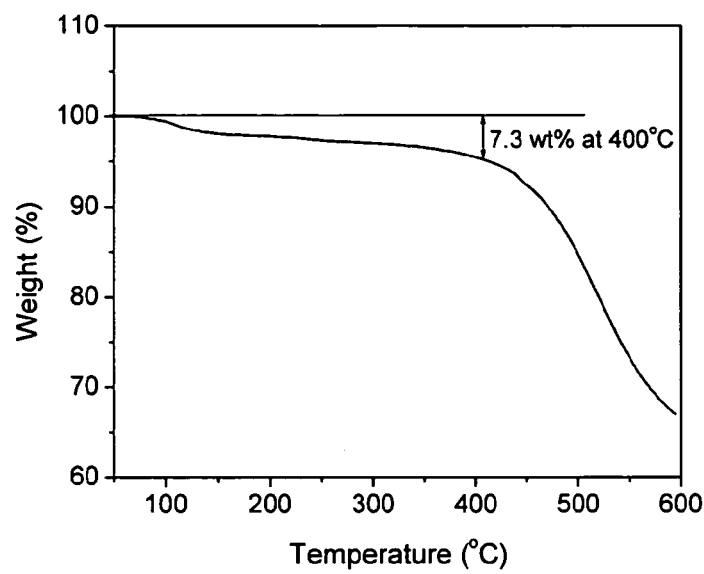
FIG. 11 is a TGA curve of EDEB oligomer under nitrogen.
Figure 12:
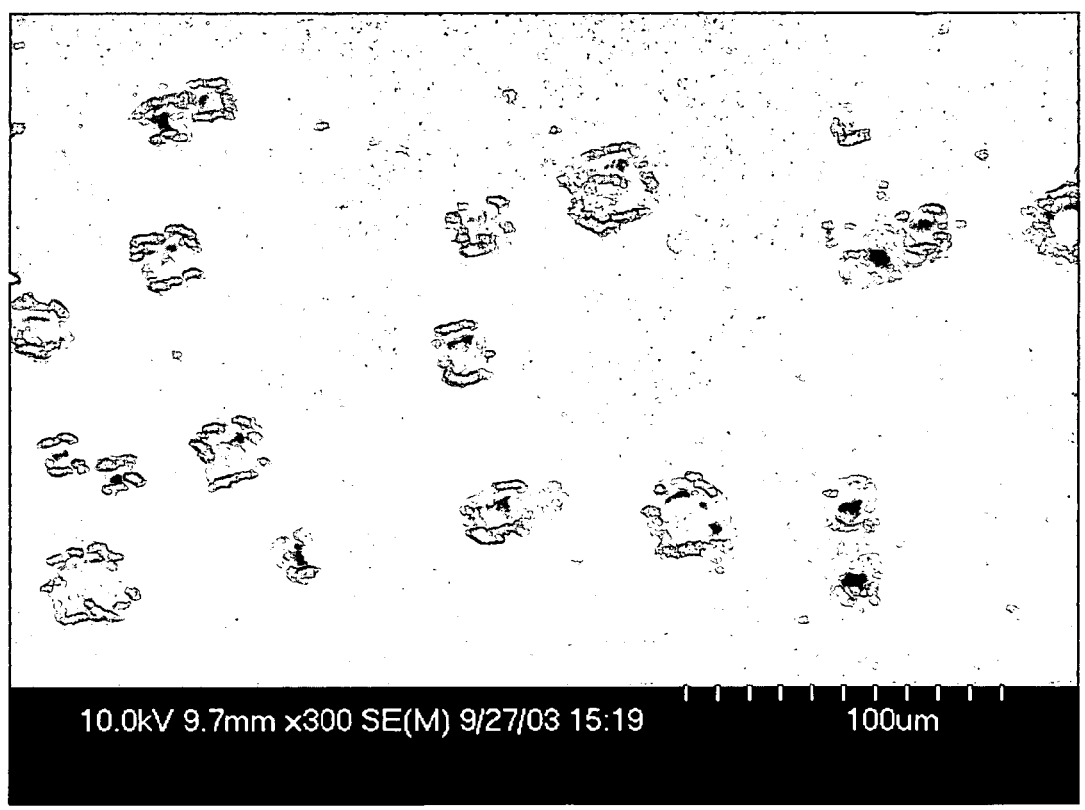
FIG. 12 is an SEM micrograph of polyEDEB.
Figure 13:
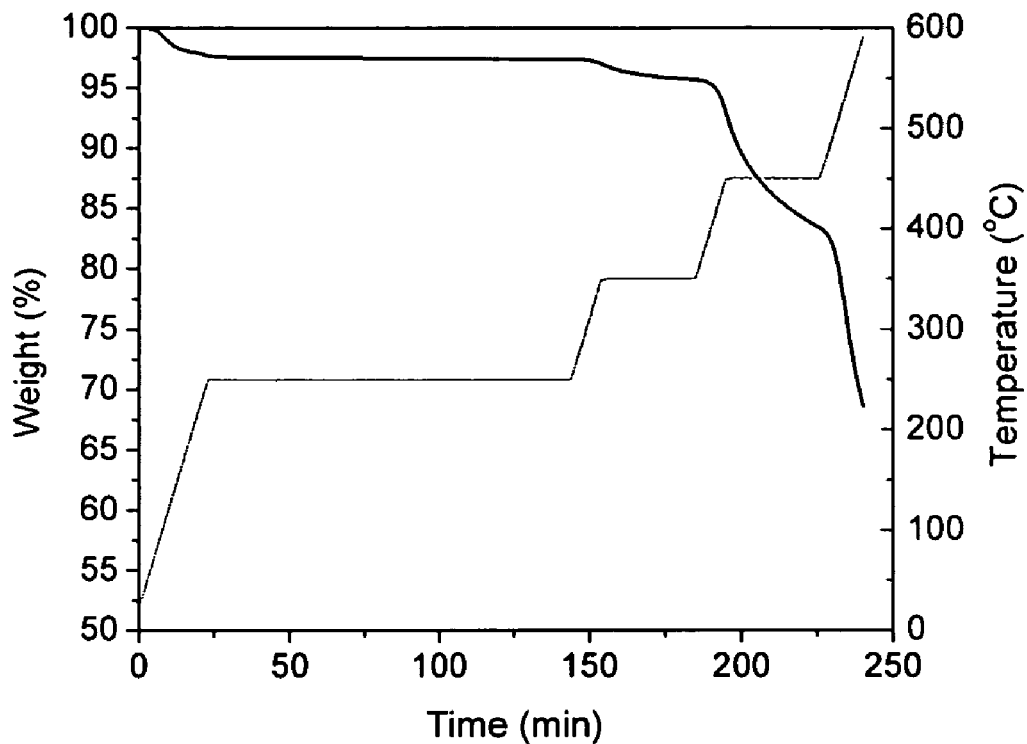
FIG. 13 is a TGA curing curve of EDEB oligomer.

The solubility of EDEB oligomer in some common spin-coating solvents is shown in Table 3, which displayed slightly improved solubility compared to DEB oligomer. 1-methyl-2-pyrrolidinone (NMP) was used as a spin-coating solvent for preparing polyEDEB dielectric thin film. A smooth film could be easily formed. However, the thermal stability of this oligomer is greatly decreased compared to its oligomer DEB. The oligomer lost about 7.3 wt % at 400° C. while being heated under nitrogen (see FIG. 11). When the film was heated to 300° C., a porous surface was formed with the pore size around 30 μm (see FIG. 12). It appeared to arise from a subsequent reaction occurring at around 300° C. as indicated in TGA curve (see FIG. 13).

Figure 14:
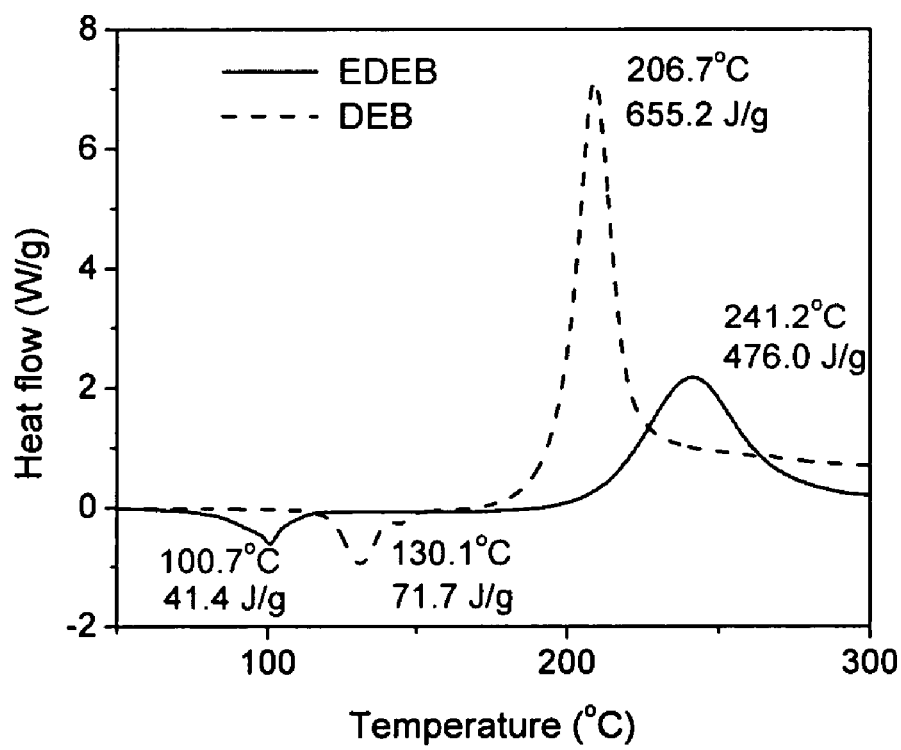
FIG. 14 shows DSC curves of oligomer EDEB and DEB.

DSC curves in FIG. 14 show that EDEB oligomer melted at around 100° C. which was approximately 30° C. lower than that of DEB, and cured at around 240° C. which was approximately 40° C. higher than that of DEB with a greatly reduced exotherm during the curing reaction. This might result from the steric hindrance effect of the aromatic ester end groups. Its crystalline nature suggests that its solubility was not significantly improved compared to DEB.

Mixture of EDEB and DEB-co-TEB

Figure 15:
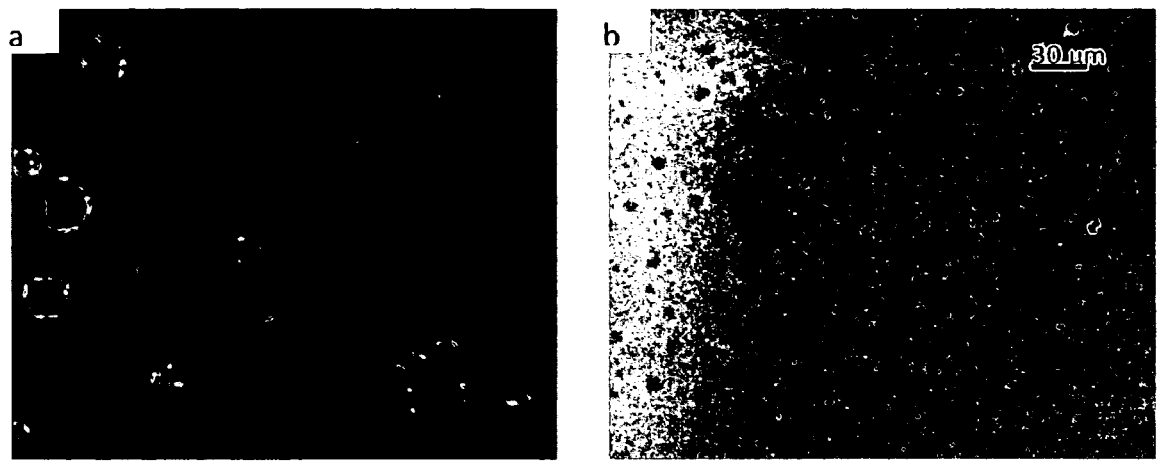
FIG. 15 shows optical micrographs of (a) cured poly-EDEB, and (b) a cured mixture of EDEB and DEB-co-TEB in a weight ratio of 1:1.

In order to take advantage of the fact that EDEB will form porous structure at around 300° C. and to decrease the pore size, oligomer DEB-co-TEB and EDEB were mixed in various weight ratios using cyclohexanone as a solvent. FIG. 15 shows that the pore size of the mixture (weight ratio of EDEB and DEB-co-TEB is 1:1) significantly decreased compared to that of EDEB. When the weight ratio of EDEB to DEB-co-TEB was around 1:6, no pores were observed from SEM and AFM image showed a smooth surface with an average roughness of 0.6 nm. The dielectric constant, the dissipation loss, and the breakdown strength of this thin film was 2.5 at 1 MHz, 0.005 and larger than 300 V/μm, respectively. The lower k value compared to that of poly(DEB-co-TEB) might be due to the formation of small pores. These good electrical properties indirectly indicate that the pores in the system are very small and have a closed structure. The average roughness of the cured 700 nm thick film was less than 0.5 nm based on AFM measurement. The elastic modulus and hardness of the 700 nm thick thin film was 15.9 GPa and 3.25 GPa, respectively, according to the nanoindentation testing using a maximum loading force of 150 μN and a loading rate of 10 μN/s. These two values are slightly lower than those of the cured poly(DEB-co-TEB) but still significantly higher than those of all commercially available spin-on low-k candidates.

Adhesion Property of EDEB/DEB-co-TEB (1:6) Mixture

In the following section, we used EDEB/DTB to represent the mixture of EDEB and DEB-co-TEB with a weight ratio of 1:6. The adhesion property was initially measured by immersion of the samples into cyclohexanone and ethyl acetate (EtOAc), respectively. The samples of EDEB/DTB on Si wafer, Cr and Ta are stable in the solvents. Since it was more difficult to wash off the uncured EDEB/DTB film on the Au surface with solvent (cyclohexanone) than uncured poly(DEB-co-TEB) film, the EDEB/DTB film is expected to have better adhesion to Au compared to poly(DEB-co-TEB) film.

Nanoscratch Testing Results of Polymer Thin Films on Si Wafer

Similar to that of poly(DEB-co-TEB), no nonsymmetric deformation or delamination was observed on the 700 nm thick film under a maximum normal loading force of 4000 μN. For the 200 nm thick film, both sides of the ditch became rugged and nonsymmetric when the maximum normal loading force was increased to 650 μN. This value was a little bit higher than the 600 μN loading force of poly(DEB-co-TEB) sample. Since the elastic modulus and hardness of the cured EDEB/DTB film are slightly lower than those of poly(DEB-co-TEB), deeper normal displacement and a smaller lateral force could be observed for EDEB/DTB sample during the nanoscratch test under the same conditions. In general, a thin film with lower elastic modulus and hardness is less resistant to stress. Thus, the stress will more easily transfer to the interface and cause delamination. However, the less strong EDEB/DTB film showed higher maximum loading force, which indicated that EDEB/DTB had better adhesion to Si wafer than poly(DEB-co-TEB).

Adhesion of Polymer Thin Film to Metal Layers

A smooth scratch with small symmetric pile-up at the end of the scratch mark was observed under 500 μN maximum normal loading force for Cr/Au layer on EDEB/DTB sample. This value was significantly higher than the 300 μN of poly(DEB-co-TEB). Also, the deformation of the Au surface of EDEB/DTB sample was much less dramatic than that of the poly(DEB-co-TEB). Therefore, the adhesion of EDEB/DTB thin film to the Cr/Au layer is much stronger than that of poly(DEB-co-TEB) thin film. This result is consistent with the observation that the uncured EDEB/DTB film was more difficult to wash off with cylcohexanone compared to uncured DEB-co-TEB oligomer thin film.

The nanoscratch result of the Ta/(EDEB/DTB)/Si stack sample indicate that the maximum force required to cause a marked deformation was around 1000 μN which was comparable to that of poly(DEB-co-TEB).

Characterization and Properties of DEB-co-TEPT

Figure 19:
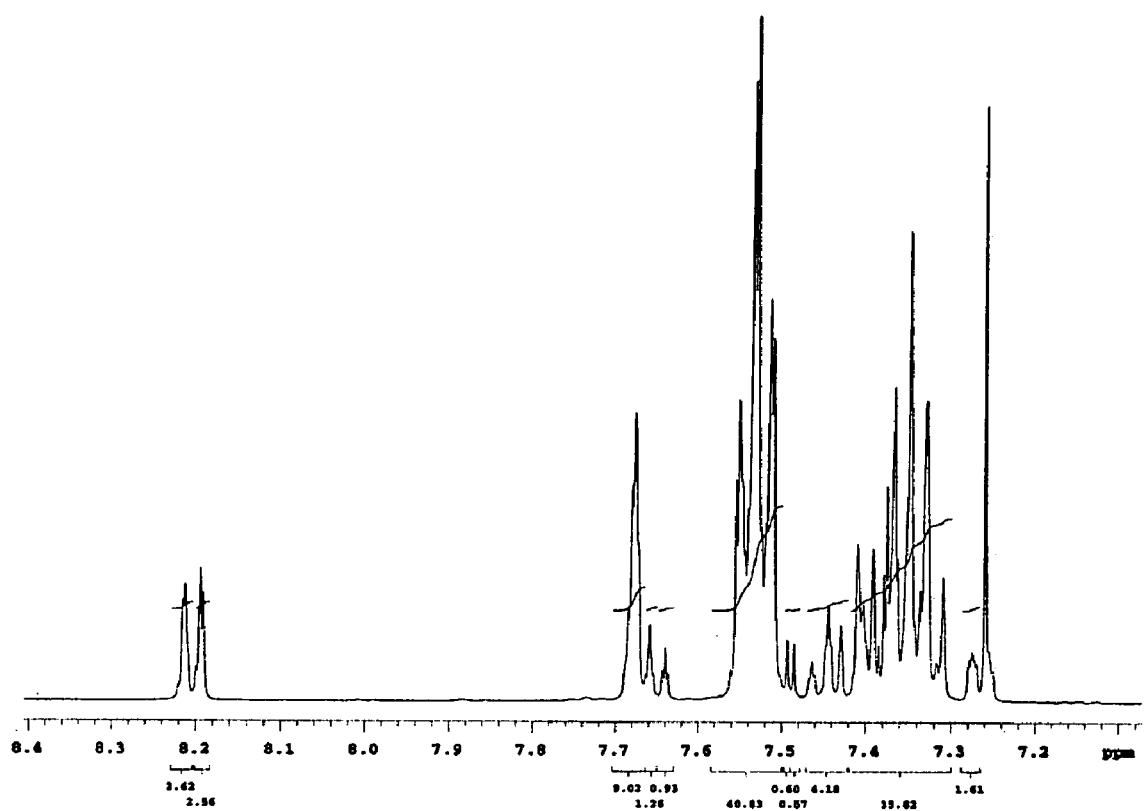
FIG. 19 is an $^1$H-NMR of DEB-co-TEPT oligomer using $CDCl_3$ as a solvent.
Figure 20:
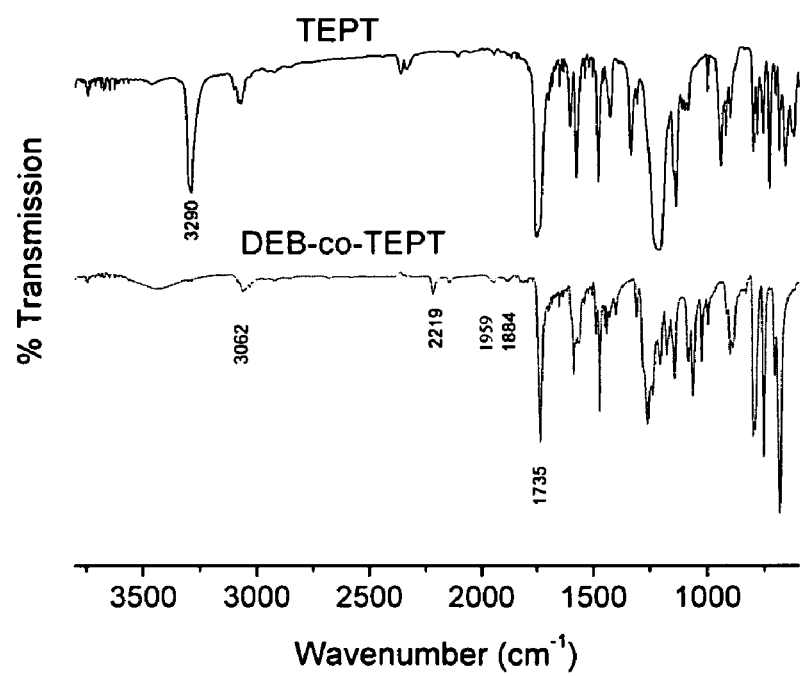
FIG. 20 illustrates a comparison of FT-IR spectra of DEB-co-TEPT oligomer and TEPT monomer.

The structure of DEB-co-TEPT oligomer was confirmed by $^1$H-NMR (δ 8.2 (m, 5H); 7.6–7.7 (m, 11H); 7.27–7.58 (m, 84H), see FIG. 19). Compared to the FT-IR spectrum of TEPT, the FT-IR spectrum of DEB-co-TEPT oligomer showed diacetylene C≡C stretch at 2220 cm$^{-1}$, ester group C=O stretch at 1735 cm$^{-1}$ and no ethynyl C—H stretch at 3300 cm$^{-1}$, indicating all ethynyl groups transferred to diacetylene groups (see FIG. 20).

The solubility of DEB-co-TEPT oligomer in some common spin-coating solvents is compared to that of DEB, as shown in Table 4. The solubility of DEB-co-TEPT oligomer was better than that of DEB but the higher concentration solution (~20 wt %) was not stable and precipitated after several hours.

TABLE 4

Comparison of the solubility of oligomer DEB-co-TEPT and DEB in some spin-coating solvents

| Solvent | DEB | DEB-co-TEPT |
|---|---|---|
| Cyclohexanone | ~5 wt % | ~15 wt % |
| NMP | <5 wt % | ~20 wt % |
| Phenylacetylene | <5 wt % | ~15 wt % |

Figure 21:
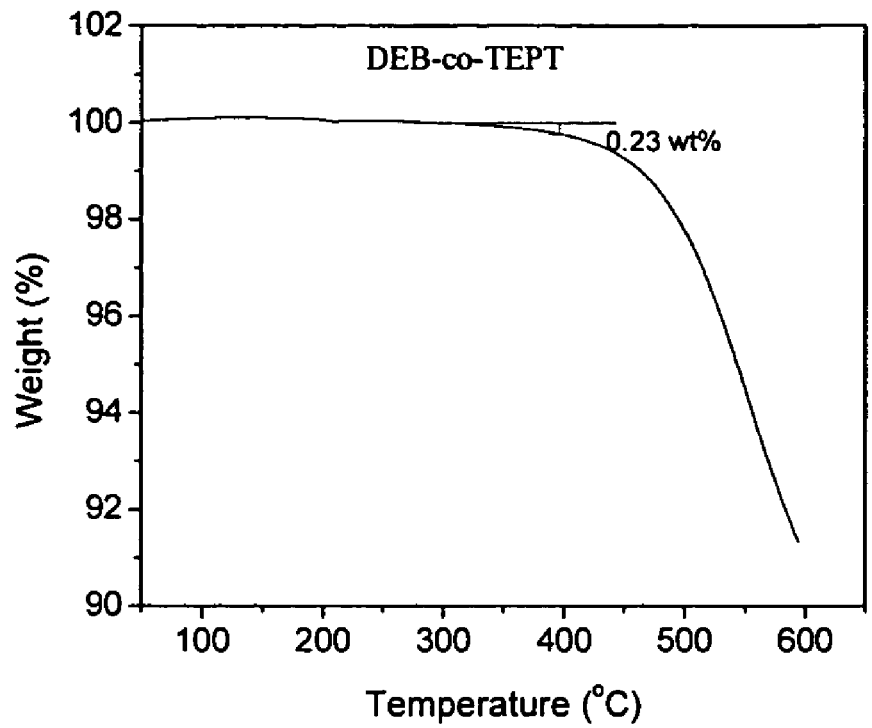
FIG. 21 is a TGA curve of DEB-co-TEPT oligomer under nitrogen at 10° C./min.

TGA curve in FIG. 21 shows that this new DEB-co-TEPT oligomer had only 0.2% weight loss at 400° C. under nitrogen, which was more thermally stable than the 7.3% weight loss of EDEB oligomer under the same conditions.

Figure 22:
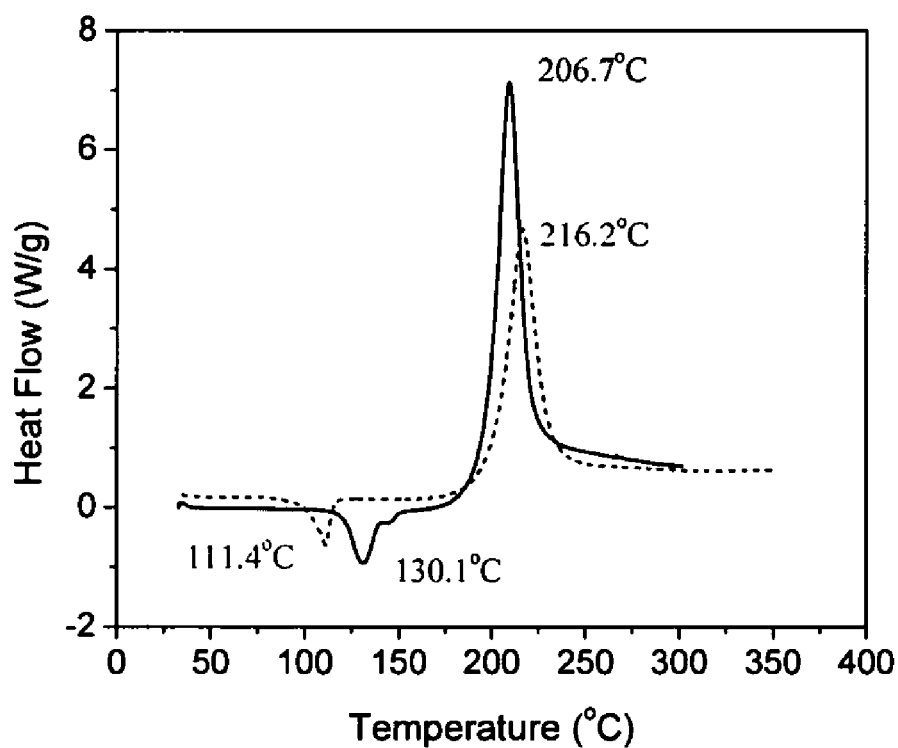
FIG. 22 shows DSC curves of oligomer DEB-co-TEPT (dash line) and DEB (solid line).

DSC curve of DEB-co-TEPT oligomer showed a melting peak at 111.4° C. which was about 20° C. lower than that of the DEB oligomer. The curing exotherm at 216.2° C. was about 8° C. higher than that of DEB but greatly reduced the amount of heat released during the curing reaction compared to that of the DEB oligomer (see FIG. 22). DEB-co-TEPT oligomer displayed UV absorptions similar to that of DEB-co-TEB oligomer except for a shoulder peak at 360 nm. This shoulder peak should allow this polymer to be more easily patterned under a standard UV source which has high intensity at 410 and 365 nm.

The cured poly(DEB-co-TEPT) thin film had a dielectric constant of 2.5 at 1 MHz, dissipation factor of 0.003 and a breakdown strength higher than 300 eV/μm.

Nanoindentation testing showed that the cured thin film had a Young's modulus of 10.0 GPa and a hardness of 2.6 GPa using a maximum normal loading force of 150 μN at a loading/unloading rate of 10μN/s. Both values are lower than that of poly(DEB-co-TEB) with a similar k value, undoubtedly because of the presence of a branched structure in the chain.

Adhesion Property of poly(DEB-co-TEPT)

The critical maximum normal loading force for poly (DEB-co-TEPT)/Si sample was 2000 μN, which was significantly larger than that of PI (200 μN) but lower than that of poly(DEB-co-TEB) or EDEB/DTB (weight ratio is 1:6) (both were 4000 μN). This arises from the fact that poly (DEB-co-TEPT) has a lower Young's modulus and hardness than poly(DEB-co-TEB) and EDEB/DTB (weight ratio is 1:6).

The Au/Cr/Polymer/Si stack sample was very stable in cyclohexanone and ethyl acetate solvents. Comparing the cross-section profile of the nanoscratch testing of DEB-co-TEPT with that of PI, the critical maximum loading force caused the evident deformation was around 350 μN for DEB-co-TEPT, which was slightly higher than the 300 μN for both PI and poly(DEB-co-TEB) but lower than the 500 μN for EDEB/DTB(1:6). This result indicated that poly (DEB-co-TEPT) had better adhesion to Cr metal layer than poly(DEB-co-TEB) but weaker than EDEB/DTB (weight ratio is 1:6).

The nanoscratch result of the Ta/Poly(DEB-co-TEPT)/Si stack sample indicate that the maximum force caused the marked deformation at around 1000 μN which is much higher than that of PI (250 μN) and comparable to that of poly(DEB-co-TEB) and EDEB/DTB in a weight ratio of 1:6.

From the nanoscratch results, adhesion of poly(DEB-co-TEPT) to Cr metal layer is slightly stronger than that of poly(DEB-co-TEB), but weaker than that of EDEB/DTB in a weight ratio of 1:6. Its adhesion to a Ta metal layer is comparable to both poly(DEB-co-TEB) and EDEB/DTB(1:6). However, its adhesion to a Si wafer was much weaker than both poly(DEB-co-TEB) and EDEB/DTB(1:6). Clearly, the adhesion of poly(DEB-co-TEPT) is lower than expected even though it also contains aromatic ester group in the polymer chain as EDEB. There are two possible reasons. The first is that the ester groups between diacetylene groups hinder the formation of a stable polycyclic aromatic structure [18], resulting in a lower Young's modulus and hardness. The force is usually more easily transferred through a material with a lower elastic modulus to the interface and cause debonding. When the force was directly on the polymer film, such as the nanoscratch test on polymer/Si sample, the effect of the reduced elastic modulus was remarkable. The second is that the ester groups are surrounded by benzene groups, and therefore might not be able to reach the surface of the polymer thin film to increase the interaction with other materials. For EDEB, the ester groups were introduced as an end-capped group and are easy to expose to the interface to increase the interaction with other materials.

REFERENCES

1. Peercy, Paul S., Nature 2000, 406(31): 1023–1026.
2. http://www.sematech.org/public/news/releases/20031119.htm.
3. http://www.sematech.org/public/news/releaseslowkmature.htm
4. Morgan, M.; Ryan, E. T.; Zhao, J.-H.; Hu, C.; Cho, T.; Ho, P. S. Annu. Rev. Mater. Sci., 2000, 30, 645.
5. Martin, S. J.; Godschals, J. P.; Mills, M. E.; Shaffer II, E. O.; Townsend, P. H. Advanced Materials, 2000, 12(23), 1769.
6. Lammers, D. EE Times, Apr. 21, 2003, http://www.eetimes.com/issue/fp/OEG20030421S0011

7. http:/twww.businesswire.com/cgi-bin/mmg.cgi?eid=4565545

8. Dawson, D. J., Reactive Oligomers, 1984;

9. Miller, T. M, Chem. Mater. 1994, 6:1569;

10. Kwock, E. W., Macromolecules, 1993, 26, 2935

11. Hay, A. S. *J. Org. Chem.* 1960, 25,1275.

12. Hay, A. S. *J. Pol. Sci. A*-11969, 7,1625.

13. Wegner, G. *Z. Naturforsch. B* 1969, 24(7), 824.

14. Grovu-Ivanoiu, M.; Bulacovschi, V.; Simionescu, C. I. *Makromol. Chem.* 1985,186, 2247.

15. Clark, R. J.; Economy, J.; Flanders, M. A.; Susko, J. R.; Wheater, R. A. Eur. Pat. Appl. EP 95048, 1983; U.S. Pat. No. 4,592,944; and U.S. Pat. No. 4,690,962.

16. Economy, J.; Flandera, M. A. U.S. Pat. No. 956,517, 1981 abandoned

17. White, D. M. Poly. Prepr. (Am. Chem. Soc., Div. Polym. Chem.) 1971, 12(1), 155.

18. Dawson, D. J.; Fleming, W. W.; Lyerla, J. R.; Economy, J. *Reaction Oligomers*, ACS Symposium 282, Harris, F. W.; Spinell, H. J. (Eds), Washington D.C., 1985, p.63.

19. Callstrom, M. R.; Neenan, T. X.; Whitesides, G. M. *Macromolecules* 1988, 21, 3530.

20. Rutherford, D. R.; Stille, J. K. *Macromolecules* 1988, 21, 3532;

21. Rutherford, D. R.; Stille, J. K.; Elliott, C. M.; Reichert, V. R. *Macromolecules* 1992, 25, 2294.

22. Miller, T. M.; Kwock, E. W.; Baird, T. Jr.; Hale, A. *Chem. Mater.* 1994, 6, 1569.

23. Oliver, W. C.; Pharr, G. M. *J. Mater. Res.* 1992, 7,1564.

What is claimed is:

1. A polymer, comprising at least two types of monomer units selected from the group consisting of:
   (1) diethynyl benzene units,
   (2) triethynyl benzene units, and
   (3) ester units;
   wherein the polymer comprises a plurality of groups having the structure —C≡C—C≡C—.

2. The polymer of claim 1, comprising diethynyl benzene units.

3. The polymer of claim 1, comprising triethynyl benzene units.

4. The polymer of claim 2, comprising triethynyl benzene units.

5. The polymer of claim 2, comprising ester units, wherein the ester units are phenyl ester units.

6. The polymer of claim 5, wherein the polymer is α,ω-(phenyl ester)-poly(m-diethynyl benzene).

7. The polymer of claim 3, wherein the polymer is α,ω-(phenyl ester)-poly(1,3,5-triethynyl benzene).

8. The polymer of claim 2, wherein the polymer is poly((m-diethynyl benzene)-co-(1,3,5-triethynyl benzene)).

9. The polymer of claim 8, wherein the polymer is α,ω-(phenyl ester)-poly((m-diethynyl benzene)-co-(1,3,5-triethynyl benzene)).

10. The polymer of claim 5, wherein the polymer is α,ω-(benzoyl-oxy-1, 3-phenyl-ethyn-2-yl)-poly(m-d lethynyl benzene).

11. The polymer of claim 3, wherein the polymer is α,ω-(benzoyl-oxy-1, 3-phenyl-ethyn-2-yl)-poly(1,3,5-triethynyl benzene).

12. The polymer of claim 8, wherein the polymer is α,ω-(benzoyl-oxy-1, 3-phenyl-ethyn-2-yl)-poly((m-diethynyl benzene)-co-(1,3,5-triethynyl benzene)).

13. The polymer of claim 4, wherein a ratio of diethynyl benzene units: triethynyl benzene units is 10:1 to 1:5.

14. The polymer of claim 4, wherein a ratio of diethynyl benzene units: triethynyl benzene units is 4:1 to 1:2.

15. The polymer of claim 8, wherein a ratio of diethynyl benzene units: triethynyl benzene units is 10:1 to 1:5.

16. The polymer of claim 8, wherein a ratio of diethynyl benzene units: triethynyl benzene units is 4:1 to 1:2.

17. The polymer of claim 9, wherein a ratio of diethynyl benzene units: triethynyl benzene units is 10:1 to 1:5.

18. The polymer of claim 9, wherein a ratio of diethynyl benzene units: triethynyl benzene units is 4:1 to 1:2.

19. A condensed polyaromatic dielectric material, having a dielectric constant of at most 2.4 at 1 MHz, an elastic modulus of at least 6.0 GPa, and a hardness of at least 1.8 GPa.

20. A condensed polyaromatic dielectric material, having a dielectric constant of at most 2.0 at 1 MHz, an elastic modulus of at least 7.7 GPa, and a hardness of at least 2.0 GPa.

21. The polymer of claim 12, wherein a ratio of diethynyl benzene units: triethynyl benzene units is 10:1 to 1:5.

22. The polymer of claim 12, wherein a ratio of diethynyl benzene units: triethynyl benzene units is 4:1 to 1:2.

23. The polymer of claim 5, wherein the phenyl ester units are selected from the group consisting of tris-(ethyn-2-yl-1, 3-phenyl)trimesate and bis-(ethyn-2-yl-1,3-phenyl)isophthalate.

24. The polymer of claim 23, wherein the polymer is poly((m-diethynyl benzene)-co-(tris-(ethyn-2-yl-1,3-phenyl)trimesate)).

25. The polymer of claim 23, wherein the polymer is poly((m-diethynyl benzene)-co-(bis-(ethyn-2-yl-1, 3-phenyl)isophthalate).

26. A composition for forming a dielectric material, comprising:
   the polymer of claim 1, and
   a porogen.

27. A composition for forming a dielectric material, comprising:
   the polymer of claim 8, and
   a porogen.

28. A composition for forming a dielectric material, comprising:
   the polymer of claim 10, and
   a porogen.

29. A composition for forming a dielectric material, comprising:
   the polymer of claim 11, and
   a porogen.

30. A composition for forming a dielectric material, comprising:
   the polymer of claim 16, and
   a porogen.

31. The composition of claim 26, further comprising a solvent.

32. The composition of claim 26, wherein the porogen comprises at least one member selected from the group consisting of polystyrene and abietic acid.

33. A method of forming a dielectric material, comprising: curing a composition comprising the polymer of claim 1.

34. A method of forming a dielectric material, comprising: curing a composition comprising the polymer of claim 8.

35. A dielectric material, prepared by the method of claim 33.

36. A dielectric material, prepared by the method of claim 34.

* * * * *

UNITED STATES PATENT AND TRADEMARK OFFICE
CERTIFICATE OF CORRECTION

PATENT NO. : 7,211,642 B2 Page 1 of 1
APPLICATION NO. : 11/094334
DATED : May 1, 2007
INVENTOR(S) : James Economy and Yongqing Huang It is certified that error appears in the above-identified patent and that said Letters Patent is hereby corrected as shown below:

On the Front Page, Item (56)

References Cited, U.S. PATENT DOCUMENTS, please delete "2003/0099847 A1" and insert --2003/099847 A1--.

In the Claims:

Claim 10, line 2, please delete "d lethy-" and insert -- diethy- --.

Signed and Sealed this

Twentieth Day of November, 2007

JON W. DUDAS
*Director of the United States Patent and Trademark Office*